(12) United States Patent
Matsuda

(10) Patent No.: US 8,130,394 B2
(45) Date of Patent: Mar. 6, 2012

(54) PRINTER SYSTEM FOR GENERATING INTERMEDIATE DATA IN DISTRIBUTED PRINTING

(75) Inventor: Hiroshi Matsuda, Yokohama (JP)

(73) Assignee: Canon Kabushiki Kaisha (JP)

( * ) Notice: Subject to any disclaimer, the term of this patent is extended or adjusted under 35 U.S.C. 154(b) by 1079 days.

(21) Appl. No.: 11/671,687

(22) Filed: Feb. 6, 2007

(65) Prior Publication Data

US 2007/0182991 A1    Aug. 9, 2007

(30) Foreign Application Priority Data

Feb. 8, 2006    (JP) .................................. 2006-031349

(51) Int. Cl.
*G06F 3/12* (2006.01)
*G06F 15/00* (2006.01)
*G06F 9/46* (2006.01)
*G06K 15/00* (2006.01)

(52) U.S. Cl. ...................... 358/1.15; 358/1.13; 358/1.14; 358/1.16; 709/202; 718/101

(58) Field of Classification Search .......................... None
See application file for complete search history.

(56) References Cited

U.S. PATENT DOCUMENTS 5,333,246 A    7/1994    Nagasaka
(Continued)

FOREIGN PATENT DOCUMENTS

JP    08-263240 A    10/1996
(Continued)

*Primary Examiner* — Benny Tieu
*Assistant Examiner* — Haris Sabah
(74) *Attorney, Agent, or Firm* — Rossi, Kimms & McDowell LLP

(57) ABSTRACT

This invention can substantially equally distribute a load necessary for rendering, and can complete printing all pages of one print job at high speed. A master printer interprets received print data, generates display list data as intermediate data for each page, and upon completion of generating intermediate data of all pages, transfers them to a slave printer. The master printer performs rendering (RIP) in an ascending page order of page numbers 1, 2, . . . , whereas the slave printer performs rendering in a descending page order from the final page. When the number of rendered pages held by the master printer does not reach half of all pages upon completion of rendering all pages, the master printer receives the rendering results of deficient pages from the slave printer. Then, each printer prints by almost the same number of pages.

13 Claims, 19 Drawing Sheets

U.S. PATENT DOCUMENTS

| | | | |
|---|---|---|---|
| 5,511,156 A | 4/1996 | Nagasaka | |
| 6,104,498 A * | 8/2000 | Shima et al. | 358/1.14 |
| 7,365,790 B2 | 4/2008 | Shinohara | |
| 7,595,903 B2 | 9/2009 | Kizaki et al. | |
| 2002/0048476 A1* | 4/2002 | Kato | 400/70 |
| 2002/0163665 A1* | 11/2002 | Iwata et al. | 358/1.15 |
| 2004/0234303 A1* | 11/2004 | Shimizubata | 399/306 |
| 2005/0105923 A1* | 5/2005 | Utsunomiya | 399/21 |
| 2005/0289215 A1* | 12/2005 | Namikata et al. | 709/200 |

FOREIGN PATENT DOCUMENTS

| | | | |
|---|---|---|---|
| JP | 10-112769 A | | 4/1998 |
| JP | 2004-229120 A | | 8/2004 |
| JP | 2004229120 | * | 8/2004 |
| JP | 2004-288071 A | | 10/2004 |
| JP | 2004288071 | * | 10/2004 |
| WO | 91-15831 A1 | | 10/1991 |

* cited by examiner

PRINTER SYSTEM FOR GENERATING INTERMEDIATE DATA IN DISTRIBUTED PRINTING

BACKGROUND OF THE INVENTION

1. Field of the Invention

The present invention relates to a technique of printing one print job by distributing it to a plurality of printing apparatuses.

2. Description of the Related Art

There have conventionally been many cluster systems which execute distributed printing using a plurality of printers to advance the print completion timing. This is because the output speed of a printer has an upper limit, and the use of not one expensive high-speed printer but a plurality of low-cost printers sometimes results in low cost.

As for the unit of distribution, there is known a technique of sharing output of copies of a print job requiring printing by a plurality of copies between printers. There is also known a technique of sharing output of pages of a print job requiring one copy between printers.

The cluster system is configured using a dedicated cluster server which performs RIP (Raster Image Process) for print data and distributes image data having undergone RIP to a plurality of printers. Alternatively, the cluster system is configured by a master printer which performs RIP for print data received by the printer, and a slave printer which receives image data having undergone RIP from the master printer and outputs it.

In the use of a dedicated cluster server, a high-performance host computer can implement high-speed RIP. However, a large installation space for the number of printers and the cluster server is necessary. The traffic of transferring image data of all pages occurs on the network. The cluster server must have a high throughput at high cost.

As a configuration similar to the latter one, there is a technique of performing page interpretation by a master printer for received print data to generate display list data as intermediate data, and transferring the display list data to another printer (e.g., Japanese Patent Laid-Open No. 2004-288071). This configuration can simplify the process and achieve high-speed printing because a printer which receives display list data only converts it into image data. The page description language (PDL) widely used as print data is sometimes not of a page independent type, and is not suitable for a parallel process. To the contrary, display list data facilitates a parallel process and implements an efficient page-distributed cluster because pages do not depend on each other. Display list data is often smaller in data size than image data, reducing the data transfer traffic.

However, the time taken to convert display list data into image data, i.e., the time taken for RIP changes between pages. This is because the number of drawing objects and their complexity are greatly different between pages. Even if an N-page document is printed by distributing print data of N/2 pages to each of two printers, the timings when the respective printers complete the print process of N/2 pages do not coincide with each other. In many cases, the timing when printing is complete by a printer which prints display list data containing many pages with many drawing objects at high complexity is much slower than the timing by another printer.

SUMMARY OF THE INVENTION

The present invention has been made to overcome the conventional drawbacks, and has as its object to provide a technique of substantially equally distributing, to a plurality of printing apparatuses, a load necessary for a data conversion process for each page of a print job and a load necessary for a print process based on image data generated by the conversion process.

According to the present invention, the foregoing object is attained by providing a printing system having at least two printing apparatuses which execute a print process, comprising:

an intermediate data generation unit which generates intermediate data of a plurality of pages on the basis of a print job received from an external apparatus;

a data conversion unit which generates image data of a plurality of pages, the data conversion unit having a first conversion unit which converts the intermediate data of a first page range into image data available for the print process in a first printing apparatus, and a second conversion unit which converts the intermediate data of a second page range into image data available for the print process in a second printing apparatus;

a setting unit which sets distribution of the number of pages of image data to be printed by the first printing apparatus and the number of pages of image data to be printed by the second printing apparatus when executing the print process based on the image data of the plurality of pages generated by the data conversion unit;

an image data transmission unit which, when the distribution set by the setting unit is different from distribution of the number of pages of the first page range and the number of pages of the second page range, transmits image data from a printing apparatus, which holds image data by the number of pages exceeding the distribution set by the setting unit, to another printing apparatus; and a printing unit having a first printing unit which executes the print process on the basis of image data held by the first printing apparatus, and a second printing unit which executes the print process on the basis of image data held by the second printing apparatus.

According to another aspect of the present invention, the foregoing object is attained by providing a printing apparatus connected to another printing apparatus via a network, comprising:

a reception unit which receives a print job from an external apparatus;

an intermediate data generation unit which generates intermediate data of a plurality of pages on the basis of the print job received by the reception unit;

an intermediate data transmission unit which transmits the intermediate data generated by the intermediate data generation unit to the other printing apparatus;

a data conversion unit which converts the intermediate data of a first page range generated by the intermediate data generation unit to generate image data available for the print process;

a setting unit which sets distribution of the number of pages of image data to be printed by the printing apparatus and the number of pages of image data to be printed by the other printing apparatus when executing the print process on the basis of the image data of the plurality of pages generated by the data conversion unit;

an image data communication unit which, when the distribution set by the setting unit is different from distribution of the number of pages of the first page range and the number of pages of the second page range, and the number of pages of the first page range exceeds the number of pages distributed to the printing apparatus by the setting unit, transmits image data corresponding to exceeding pages to the other printing apparatus, and when the number of pages of the first page range is smaller than the number of pages distributed to the printing apparatus by the setting unit, receives image data corresponding to deficient pages from the other printing apparatus; and a printing unit which executes the print process on the basis of image data distributed to the printing apparatus after the image data communication unit performs communication.

In still another aspect of the present invention, the foregoing object is attained by providing a printing method in a printing system having at least two printing apparatuses which execute a print process, comprising:

an intermediate data generation step of generating intermediate data of a plurality of pages on the basis of a print job received from an external apparatus;

a data conversion step of generating image data of a plurality of pages, the data conversion step having a first conversion step of converting the intermediate data of a first page range into image data available for the print process in a first printing apparatus, and a second conversion step of converting the intermediate data of a second page range into image data available for the print process in a second printing apparatus;

a setting step of setting distribution of the number of pages of image data to be printed by the first printing apparatus and the number of pages of image data to be printed by the second printing apparatus when executing the print process based on the image data of the plurality of pages generated in the data conversion step;

an image data transmission step of, when the distribution set in the setting step is different from distribution of the number of pages of the first page range and the number of pages of the second page range, transmitting image data from a printing apparatus, which holds image data by the number of pages exceeding the distribution set in the setting step, to another printing apparatus; and a printing step of executing the print process on the basis of image data held by the first printing apparatus, and executing the print process on the basis of image data held by the second printing apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments according to the present invention will be described in detail below with reference to the accompanying drawings.

Figure 1:
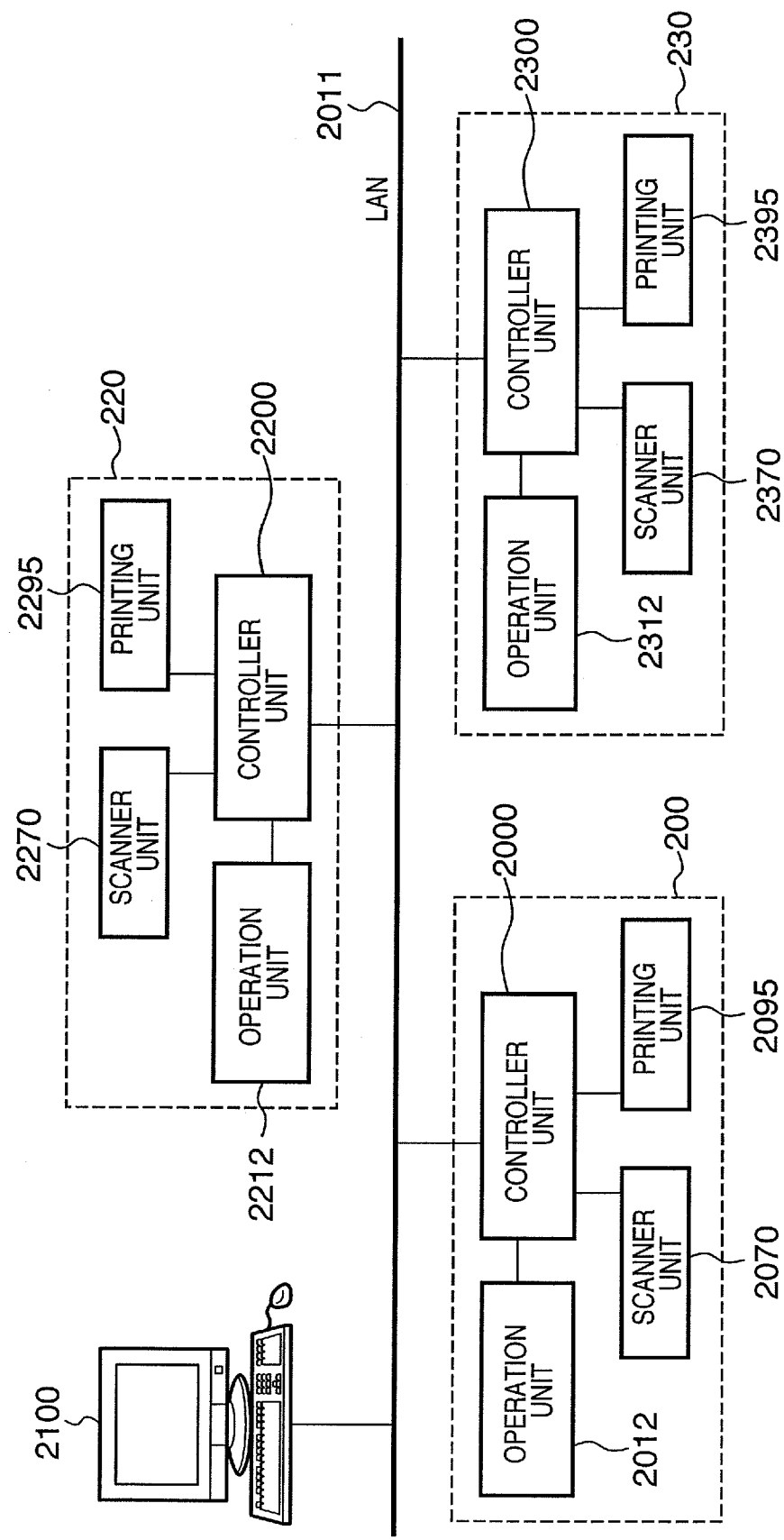
FIG. 1 is a view showing the overall configuration of a system in an embodiment.

FIG. 1 is a view for explaining the overall configuration of a printing system according to an embodiment of the present invention. An image forming apparatus 200 comprises a scanner unit 2070 serving as an image input device, a printing unit 2095 serving as an image output device, a controller unit 2000, and an operation unit 2012 serving as a user interface. The scanner unit 2070, printing unit 2095, and operation unit 2012 are connected to the controller unit 2000. The controller unit 2000 is connected to a network transmission unit (network interface) such as a LAN 2011. The type of LAN 2011 is arbitrary (wired or wireless). Other image forming apparatuses 220 and 230 having the same configuration as that of the image forming apparatus 200 are connected to the LAN 2011. The image forming apparatus 220 comprises a scanner unit 2270, a printing unit 2295, an operation unit 2212, and a controller unit 2200 connected to them. The image forming apparatus 230 also comprises a scanner unit 2370, a printing unit 2395, an operation unit 2312, and a controller unit 2300 connected to them.

A host computer 2100 typified by a personal computer or the like is connected to the LAN 2011.

In FIG. 1, one host computer 2100 and three image forming apparatuses 200, 220, and 230 are connected to the LAN 2011. However, the number of host computers and the number of image forming apparatuses are arbitrary. Another network device may also be connected to the LAN 2011.

Figure 2:
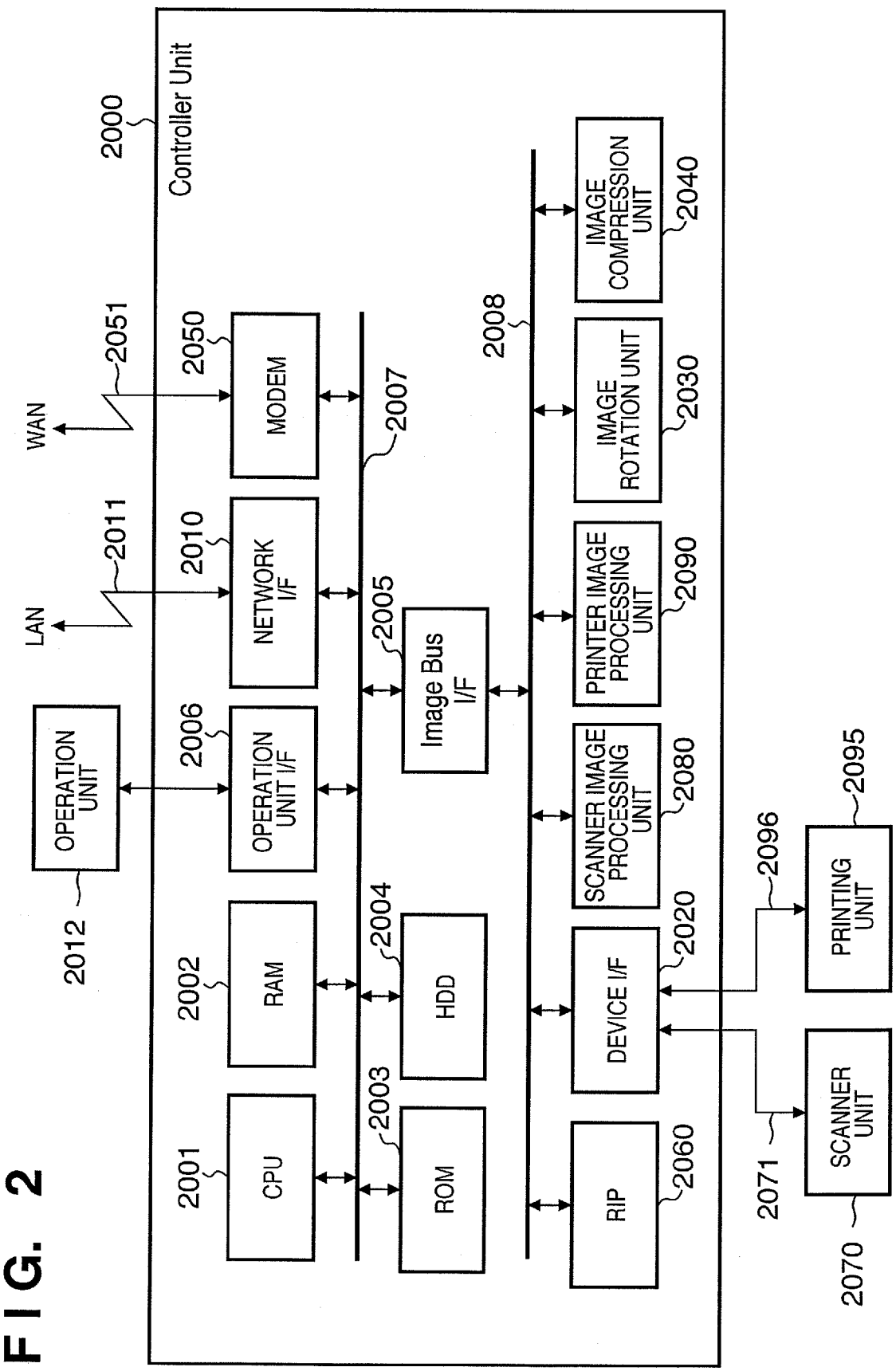
FIG. 2 is a block diagram showing the internal configuration of the controller unit of an image forming apparatus in the embodiment.

FIG. 2 is a block diagram for explaining the configuration of the image forming apparatus 200. The remaining image forming apparatuses 220 and 230 also have the same configuration, and a description thereof will be omitted.

The controller unit 2000 is connected to the scanner unit 2070 serving as an image input device, the printing unit 2095 serving as an image output device, and the operation unit 2012. The controller unit 2000 is connected to the LAN 2011 or a public line (WAN) 2051 to input/output image information and device information. A CPU 2001 is a controller which controls the whole image forming apparatus 200. A RAM 2002 is a system work memory for operating the CPU 2001, and is also used as an image memory for temporarily storing image data. A ROM 2003 is a boot ROM which stores the boot program of the system. An HDD 2004 is a hard disk drive which stores system software and image data. The embodiment exemplifies the HDD 2004, but another storage device is also applicable as long as its storage capacity is large.

An operation unit I/F 2006 is an interface for communicating with the operation unit (UI) 2012. The operation unit I/F has functions of outputting image data to be displayed on the display device (e.g., liquid crystal display) of the operation unit 2012, and transmitting, to the CPU 2001, inputs from a user to various switches and buttons of the operation unit 2012 and its touch panel.

A network I/F 2010 is an interface for communicating with the LAN 2011. A Modem 2050 connects to the public line 2051 to input/output information. These devices are arranged on a system bus 2007. An image bus I/F 2005 is a bus bridge which connects the system bus 2007 to an image bus 2008 for transferring image data at high speed, and converts the data structure. The image bus 2008 is formed from a PCI bus or IEEE1394.

The following devices are arranged on the image bus 2008.

An image processor (RIP) 2060 rasterizes a display list into a raster image. A device I/F 2020 is an interface which connects the scanner unit 2070 and printing unit 2095 serving as image input/output devices to the image bus 2008 via signal lines 2071 and 2096.

A scanner image processing unit 2080 receives image data from the scanner unit 2070 via the device I/F 2020, and corrects, processes, and edits the image data. A printer image processing unit 2090 performs printer correction, resolution conversion, halftoning, and the like for printout image data, and outputs the resultant image data from the device I/F 2020 to the printing unit 2095.

An image rotation unit 2030 rotates image data. An image compression unit 2040 compresses/decompresses multilevel image data by JPEG, and binary image data by JBIG, MMR, or MH.

Figure 3:
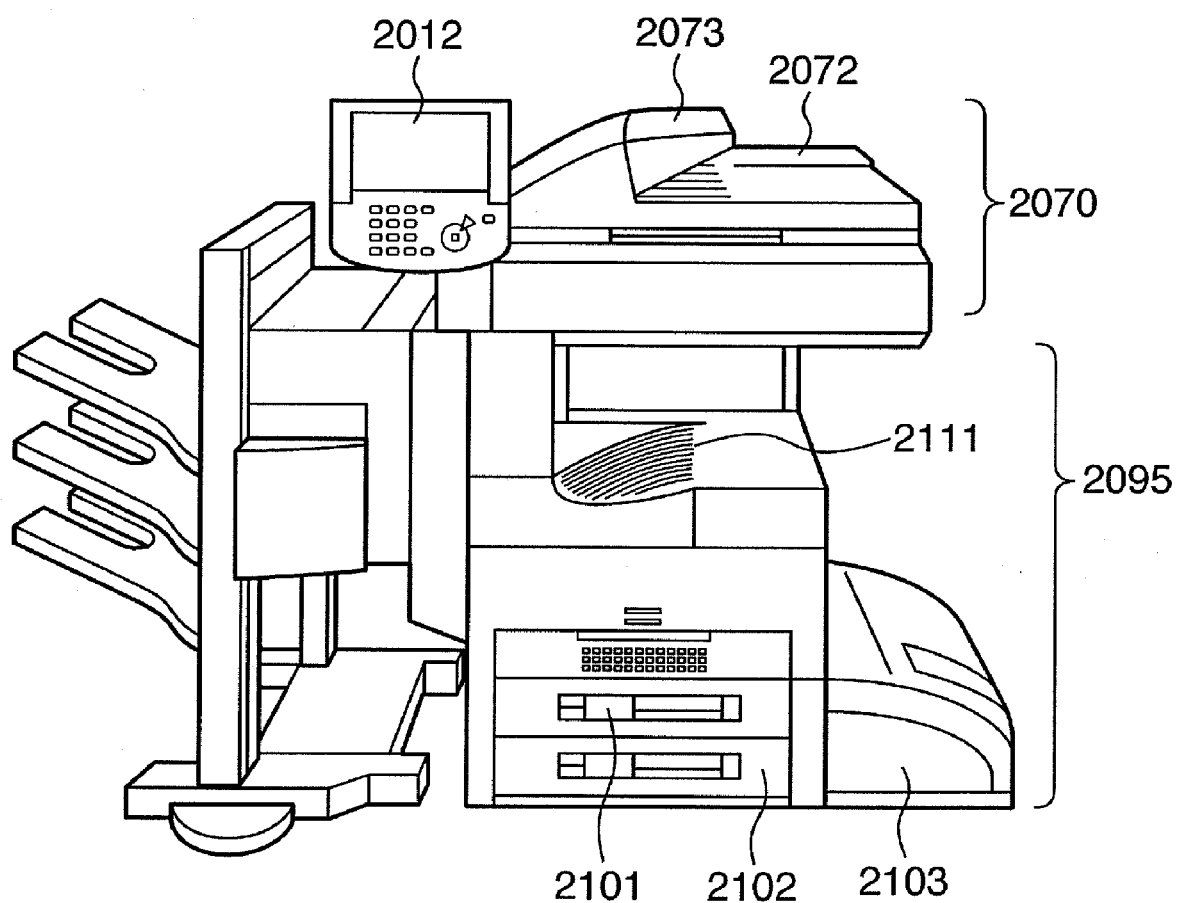
FIG. 3 is a view showing the outer appearance of the image forming apparatus.

FIG. 3 shows the outer appearance of the image forming apparatus 200. The scanner unit 2070 serving as an image input device illuminates an image on a document sheet, and scans a CCD line sensor (not shown) to convert raster image data into an electrical signal. A document sheet is set on a tray 2073 of a document feeder 2072. The user of the image forming apparatus 200 designates the activation of scanning from the operation unit 2012, and the CPU 2001 gives the instruction to the scanner unit 2070. The feeder 2072 feeds document sheets one by one to the document scanning plane, thereby scanning the document image.

The printing unit 2095 serving as an image output device forms an image on a sheet in accordance with raster image data. This forming method is arbitrary and is, for example, an electrophotographic printing method using a photosensitive drum or photosensitive belt, or an inkjet method of discharging ink from a small nozzle array to directly print an image onto a sheet. The print operation starts when the CPU 2001 outputs an instruction via the signal line 2096. The printing unit 2095 has a plurality of sheet feed stages so that the user can select different paper sizes and paper orientations, and comprises sheet cassettes 2101, 2102, and 2103 in correspondence with the respective sheet feed stages. A delivery tray 2111 receives a printed sheet.

Figure 4:
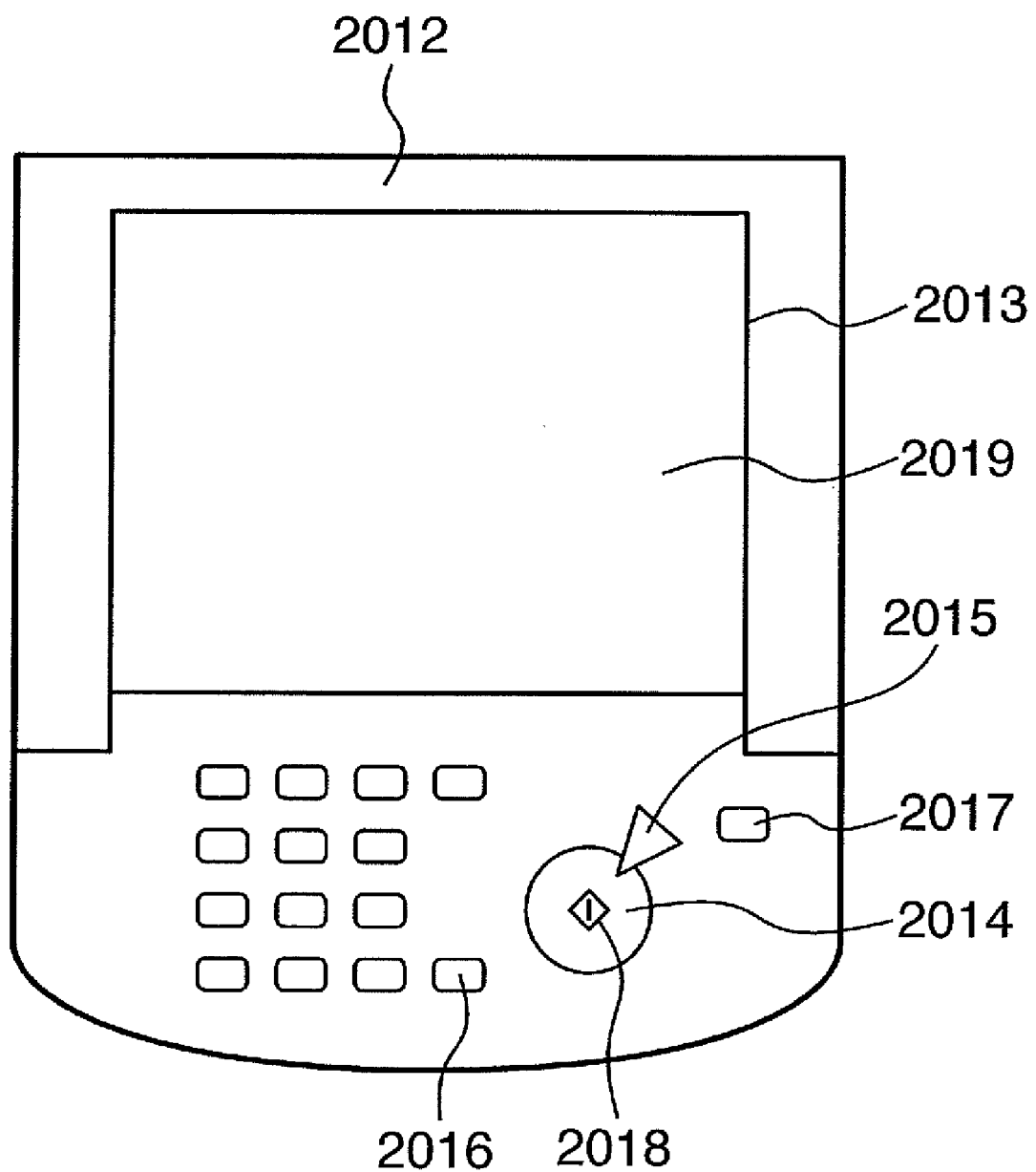
FIG. 4 is a view showing the outer appearance of the operation unit of the image forming apparatus.

FIG. 4 shows the structure of the operation unit 2012. An LCD display unit 2013 has a touch panel sheet 2019 on the LCD. The LCD display unit 2013 displays a system operation window and soft keys, and when the user presses a displayed key, transmits the position information to the controller CPU 2001. A start key 2014 is used to start scanning a document image. An LED 2018 in two, green and red colors is arranged at the center of the start key 2014, and lights in either color to represent whether the start key 2014 is available. A stop key 2015 is used to stop the current operation. An ID key 2016 is used to input the user ID of a user. A reset key 2017 is used to initialize settings from the operation unit.

Figure 5:
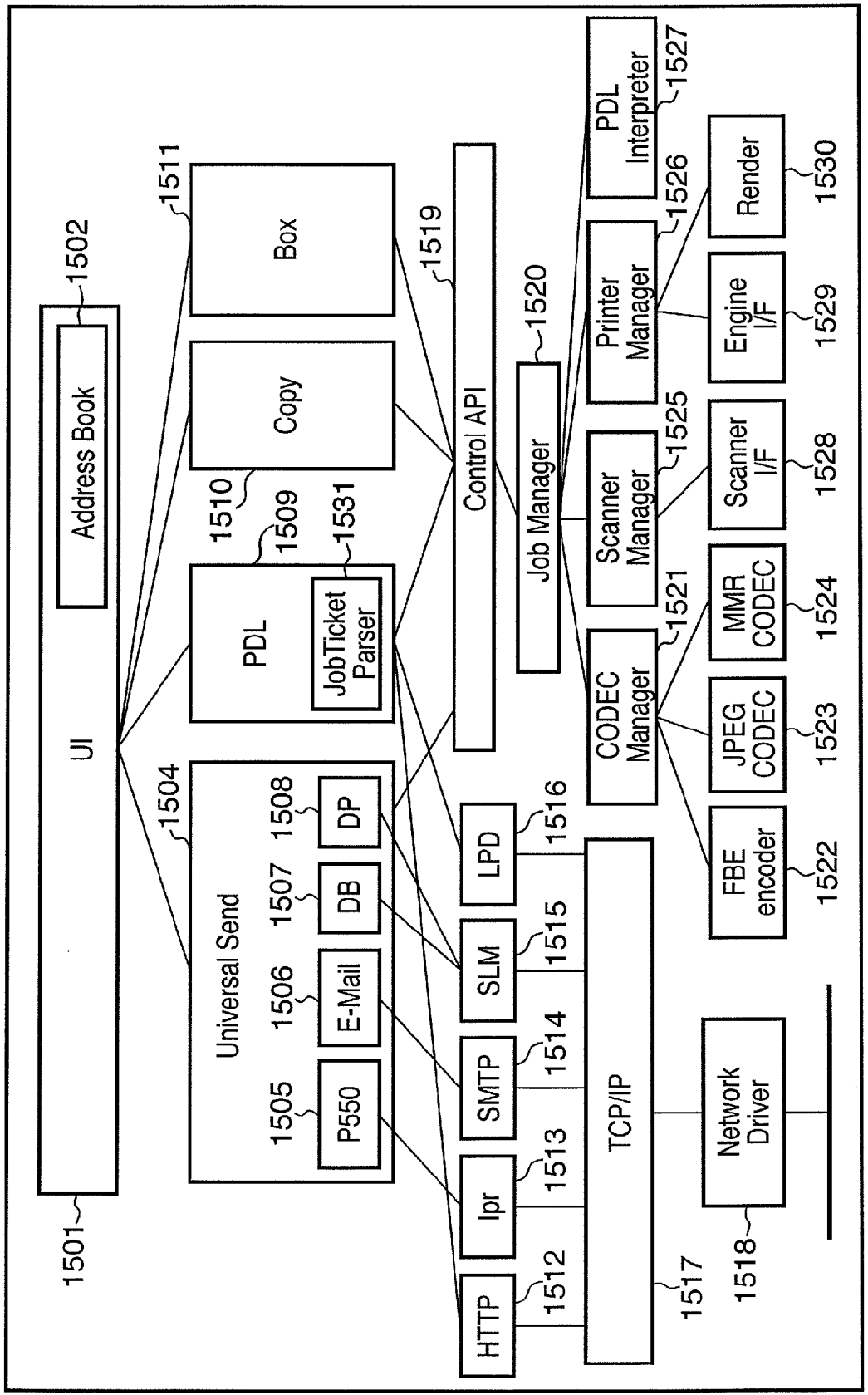
FIG. 5 is a block diagram showing the software of the image forming apparatus.

FIG. 5 is a block diagram showing the software of the image forming apparatus 200 in the embodiment.

Reference numeral 1501 denotes a UI (User Interface) module which manages the UI and interfaces devices when the operator performs various operations and settings of the image forming apparatus. The UI module 1501 transfers input information to various modules (to be described later) in accordance with an operation by the operator, and makes a process request, data setting, and the like.

Reference numeral 1502 denotes a database module which manages Address Book, i.e., a data sending destination, communication destination, and the like. The operator operates the UI module 1501 to add data to, delete it from, or acquire it from the contents of Address Book. Further, the Address Book module 1502 gives data sending/communication destination information to each module (to be described later) in accordance with an operation by the operator.

Reference numeral 1504 denotes a Universal Send module which manages data distribution, and distributes data designated by the operator via the UI module 1501 to a similarly designated communication (output) destination. When the operator designates generation of distribution data using the scanner function of the apparatus, the Universal Send module 1504 generates data by operating a device via a Control API module 1519 (to be described later). Reference numeral 1505 denotes a module executed when designating the printer as an output destination within the Universal Send module 1504. Reference numeral 1506 denotes a module executed when designating an E-mail address as a communication destination within the Universal Send module 1504. Reference numeral 1507 denotes a module executed when designating the database as an output destination within the Universal Send module 1504. Reference numeral 1508 denotes a module executed when designating an image forming apparatus identical to the image forming apparatus 200 as an output destination within the Universal Send module 1504.

Reference numeral 1509 denotes a PDL module which implements a function of printing a PDL (Page Description Language) document transmitted from outside the image forming apparatus using the print function of the image forming apparatus. Reference numeral 1531 in the PDL module 1509 denotes a Job Ticket Parser module which interprets job ticket data received together with PDL data. The job ticket can designate a print medium, the number of copies, a post-process, various color processes, and an image processing method. These pieces of information are interpreted by the Job Ticket Parser 1531 and transmitted to a Job Manager module 1520, Printer Manager module 1526, and PDL Interpreter module 1527 (to be described later) via the Control API module 1519 (to be described later). The PDL module 1509 also provides a function of extracting and printing an electronic document stored in an external Web server using an HTTP module 1512.

Reference numeral 1510 denotes a Copy module which executes a Copy operation based on a UI instruction using the printer and scanner functions of the image forming apparatus.

Reference numeral 1511 denotes a Box module. The Box module 1511 provides a function of storing a scanned image or PDL print image in the HDD, and managing printing of the stored image by the printer function, transmission by the Universal Send function, deletion of a document stored in the HDD, grouping (storage in an individual box), movement between boxes, copying between boxes, and the like.

The module 1512 is used when the image forming apparatus communicates by HTTP. The HTTP module 1512 provides communication to the PDL module 1509 from a TCP/IP module 1517 (to be described later). Reference numeral 1513 denotes an Ipr module which provides communication to the printer module 1505 in the Universal Send module 1504 from the TCP/IP module 1517 (to be described later). Reference numeral 1514 denotes an SMTP module which provides communication to the E-mail module 1506 in the Universal Send module 1504 from the TCP/IP module 1517 (to be described later). Reference numeral 1515 denotes an SLM, i.e., Salutation Manager module which provides communication to the database module 1507 and DP module 1508 in the Universal Send module 1504 from the TCP/IP module 1517 (to be described later). Reference numeral 1516 denotes an LPD module which provides communication to the PDL module 1509 from the TCP/IP module 1517 (to be described later). The TCP/IP communication module 1517 provides network communication from a Network Driver (to be described later) to various modules described above. Reference numeral 1518 denotes a network driver which controls a part physically connected to the network.

The Control API module 1519 interfaces host modules (e.g., the Universal Send module 1504, PDL module 1509, Copy module 1510, and Box module 1511) with submodules (e.g., the Job Manager module 1520 to be described later). The Control API module 1519 reduces the dependence between host modules and submodules, and enhances their diversion.

The Job Manager module 1520 interprets processes designated by various modules described above via the Control API 1519, and gives instructions to modules (to be described later). The Job Manager module 1520 centralizes hardware processes executed in the image forming apparatus. Reference numeral 1521 denotes a CODEC Manager module which manages and controls various compression/decompression processes for data among processes designated by the Job Manager module 1520. Reference numeral 1522 denotes an FBE Encoder module which compresses, in the FBE format, data read by a scan process executed by the Job Manager module 1520 and a Scanner Manager module 1525. Reference numeral 1523 denotes a JPEG CODEC module which JPEG-compresses scanned data in a scan process executed by the Scanner Manager module 1525 and JPEG-decompresses print data in a print process executed by the Printer Manager module 1526. Reference numeral 1524 denotes an MMR CODEC module which MMR-compresses scanned data in a scan process executed by the Scanner Manager module 1525 and MMR-decompresses print data in a print process executed by the Printer Manager module 1526.

The Scanner Manager module 1525 manages and controls a scan process designated by the Job Manager module 1520. Reference numeral 1528 denotes a Scanner I/F module which provides an I/F between the Scanner Manager module 1525 and the scanner unit internally connected to the image forming apparatus.

The Printer Manager module 1526 manages and controls a print process designated by the Job Manager module 1520. Reference numeral 1529 denotes an Engine I/F driver which provides an I/F between the Printer Manager module 1526 and the printing unit.

The PDL Interpreter module 1527 interprets a PDL or electronic document format such as LIPS, PostScript, PCL, PDF, or SVG in accordance with an instruction from the Job Manager module 1520, and generates a display list which is a common transcription independent of the PDL or electronic document format.

Reference numeral 1530 denotes a Render module which rasterizes a display list generated by the PDL Interpreter module 1527 in the raster image memory using an image processor in accordance with an instruction from the Printer Manager module 1526.

The sequence of a RIP process of interpreting a page description language and forming an image will be explained with reference to FIG. 6.

A PostScript interpreter 3001 is one of modules contained in the PDL Interpreter module 1527 of FIG. 5. The PostScript interpreter 3001 interprets data described in the PostScript language to generate a display list 3017 as intermediate language data.

Modules in the PostScript interpreter 3001 are pipeline-executed. Modules 3004 to 3011 are repetitively executed for each drawing object, and at the end of processing all drawing objects in the same page, a display list of one page is generated and output.

A detailed RIP parameter 3016 is a parameter group applied in a RIP process among information designated by a job ticket. Parameters applied here are an output color mode, RGB source profile, CMYK simulation profile, and output profile. The Job Ticket Parser module 1531 in FIG. 5 interprets the job ticket, as described above.

Figure 6:
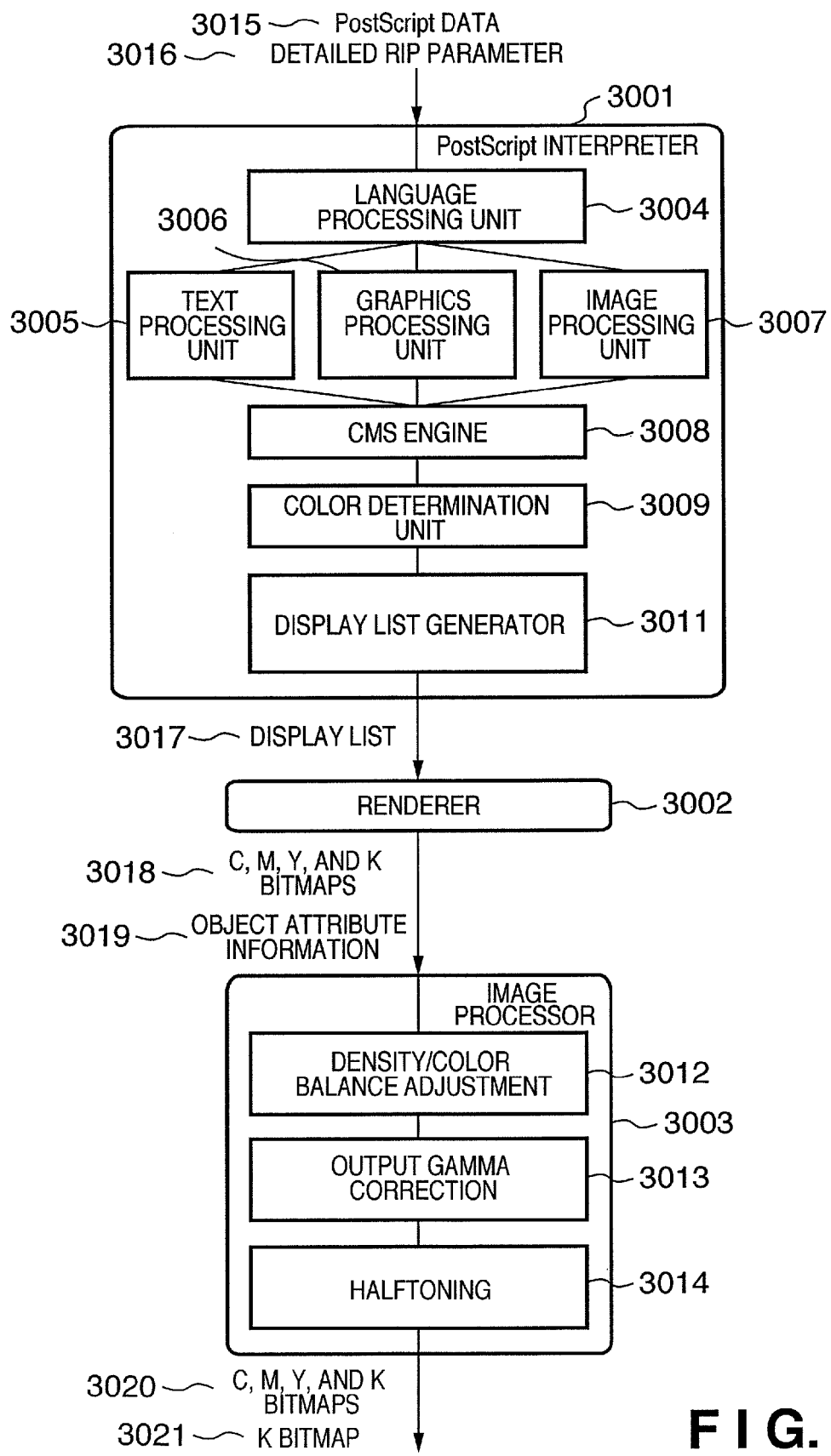
FIG. 6 is a view showing the process order and data flow of the image forming apparatus.

In the sequence of the RIP process in FIG. 6, whether the entire page is in color or monochrome is determined based on the color of drawing objects contained in each page. Assume that the output color mode setting is "Auto".

The language processing unit 3004 interprets PostScript language data, and outputs it to one of the text processing unit 3005, graphics processing unit 3006, and image processing unit 3007 in accordance with the interpretation result.

The text processing unit 3005 generates a text bitmap based on a designated font, and generates data of a predetermined format containing the drawing coordinates and color in order to cope with a rendering process. The graphics processing unit 3006 converts an instruction of computer graphics or the like into data of a predetermined format (containing color) in order to increase the rendering process speed. The image processing unit 3007 converts image data into a common internal data format.

The CMS engine 3008 is a module which manages the colors, and generates output colors (CMYK) unique to the printer engine after converting input colors into an absolute color space. The PostScript language defines various color spaces such as the Device color space, CIEBased color space, and special color space. As for input colors designated in the Device color space, the CMS engine 3008 converts the colors using a designated one of prepared ICC profiles such as an RGB source profile and CMYK simulation profile. As for input colors designated in the CIEBased color space, the CMS engine 3008 converts the colors using a conversion table, conversion function, and conversion matrix designated in the color space. The CMS engine 3008 converts an absolute color space into a color space unique to the printer engine using an output profile or a color rendering dictionary defined by PostScript. Two profiles, i.e., a gray compensation profile which preferentially represents the gray scale in a single K color, and a normal profile which represents the gray scale in four C, M, Y, and K colors are selectively used as the output profile. The CMS engine 3008 converts a spot color designated in the Separation color space, DeviceN color space, or the like into process colors (C, M, Y, and K) using a Named ICC profile.

The color determination unit 3009 checks C, M, Y, and K colors as values output from the CMS engine, and determines whether a page in process is a color or monochrome page. The color is determined only when the output color mode of the detailed RIP parameter designates Auto. In addition, the output color mode can designate color or monochrome, and the color determination unit 3009 does not determine the color when the output color mode designates color or monochrome.

The display list generator 3011 generates the display list 3017 as intermediate language data. The display list contains the attribute flag of each object to identify whether the object is graphics, an image, or a text. Each attribute is directly notified from the text processing unit 3005, graphics processing unit 3006, and image processing unit 3007. The attribute flag is used for a subsequent image process through a renderer 3002. The display list contains raster operation information of each object to identify whether the object requires a raster operation process.

The renderer 3002 corresponds to the RIP 2060 in FIG. 2. The RIP 2060 has four plane memories for storing C (Cyan), M (Magenta), Y (Yellow), and K (blacK) bitmap images at an 8-bit depth (256 gray levels), and an attribute plane memory at a 2-bit depth.

The renderer 3002 interprets a display list to generate C, M, Y, and K bitmap images 3018 to be drawn in the four plane memories. In other words, the renderer 3002 executes a data conversion process from a display list into a bitmap image (data printable by the printing unit 2095). The RIP 2060 in FIG. 2 performs most part of this generation process. The renderer 3002 has raster operation modes such as Mask (result=src & dest), Copy (result=src), and Merge (result=src|dest). That is, the renderer 3002 executes a raster operation process between a drawn object (background, dest) and the next object to be drawn (foreground, src), and expands the drawing result in the page memory in accordance with a raster operation mode designated for each drawing object.

The renderer 3002 writes, in the fifth attribute plane memory, an object attribute map 3019 representing the attribute of each device pixel based on an attribute flag contained in the display list 3017. The attribute plane memory has a 2-bit depth for each pixel, as described above. The renderer 3002 writes "01" for a graphic pixel, "10" for an image (natural image) pixel, and "11" for a character/line image pixel.

The C, M, Y, and K bitmaps 3018 and object attribute map 3019 are sent to an image processor 3003.

Whether to perform rendering after creating the display list depends on control by the Job Manager 1520 and Printer Manager 1526. If rendering is not done immediately, the created display lists of respective pages are sequentially stored at predetermined positions in the HDD 2004.

The image processor 3003 performs image processes such as density/color balance adjustment 3012, output gamma correction 3013, and halftoning 3014 for the C, M, Y, and K bitmaps 3018 generated by the renderer 3002 under the control of the Printer Manager 1526 in FIG. 5.

The image processor 3003 applies different halftoning as the halftoning 3014 to each object attribute by referring to the object attribute map 3019. For example, the image processor 3003 executes a process as the halftoning 3014 by applying a resolution priority high-LPI screen to an image area of the graphics attribute, a tonality priority low-resolution screen to an image area of the image attribute, and error diffusion to an image area of the text attribute.

When the color determination unit 3009 determines that the page of interest is a monochrome page, the image processor 3003 receives only the bitmap of the K component among the C, M, Y, and K bitmaps 3018 created by the renderer 3002, and generates a K bitmap 3021 used for a final output. When the color determination unit 3009 determines that the page of interest is a color page, the image processor 3003 receives the C, M, Y, and K bitmaps 3018 created by the renderer 3002, and generates C, M, Y, and K bitmaps 3020 used for a final output. The C, M, Y, and K bitmaps 3020 or K bitmap 3021 generated by the image processor 3003 is transferred to the printer engine via the Engine I/F 1529 in FIG. 5, and printed out on a desired print medium such as a print sheet.

The image forming apparatus has two print modes. One is a RIP/print parallel mode in which the print process of the generated C, M, Y, and K bitmaps 3020 or K bitmap 3021 and the page interpretation or rendering process of the next page are parallel-executed. The other is a RIP/print sequential mode in which the print process is performed sequentially after rendering all pages in one job. In the RIP/print parallel mode, no page may be output at the engine speed if page interpretation or rendering takes a long time. In the RIP/print sequential mode, a plurality of pages can be output at the engine speed. Although the job ticket can designate selection of these two modes, the RIP/print sequential mode is a default operation in the printing apparatus of the embodiment.

The hardware and software configurations in the embodiment, and the functions of the building components have been explained. A cluster (distributed) print process in the embodiment will be explained.

For descriptive convenience, the image forming apparatuses 200, 220, and 230 have the same functions, and the numbers of print sheets per unit time by the printing units 2095, 2295, and 2395 are equal. In the following description, the image forming apparatus 200 will be exemplified.

The cluster print process is a cooperative process by master and slave printers. The master printer is an image forming apparatus designated as a print data output destination by the host computer 2100. The slave printer is an image forming apparatus specified by a network address described in a job ticket received by the master printer. It should be noted that each of the image forming apparatuses 200, 220, and 230 may become a master or slave.

The "page number" in the following description represents a logical page number to be printed, and does not mean the physical page number of a document for which the host computer 2100 designates printing. For example, when the host computer edits a 200-page document and issues a job to print the 101st page to 200th page, the image forming apparatus in the embodiment processes the job so as to logically print a 100-page document. In this case, page number "1" in the following description means the 101st page of the user-desired document.

The procedures of the cluster print process will be described with reference to FIGS. 7 to 11. The Job Manager module 1520 and Printer Manager module 1526 in FIG. 5 execute a program shown in the flowcharts of FIGS. 7 to 11. The job ticket designates whether to perform cluster printing, and when cluster printing is to be performed, designates a slave printer, as described above. The Job Manager module 1520 is notified via the Control API module 1519 of a job ticket interpretation result by the Job Ticket Parser 1531.

In step S1, the image forming apparatus determines whether it has received a cluster print job from the host computer (print data generation source) 2100, i.e., whether it has received a request to function as the master of cluster printing.

If the image forming apparatus determines that it has received the request for the master printer of cluster printing, the process advances to step S2 to activate the PostScript interpreter and interpret all pages. As a result, the master printer generates display list data of all pages. The HDD 2004 stores the generated display list data. The total number of pages to be printed is turned out by this process and defined as Pmax.

The process advances to step S3 to transfer the generated display list data of all pages to the slave printer. At this time, a job ticket which instructs the target printer to operate as a slave printer is added to the display list to be transferred. The transferred display list remains in the master printer without erasing it. The Job Manager module 1520 executes up to the process in step S3. The Job Manager module 1520 activates the PostScript interpreter to execute only page interpretation.

Upon reception of the display list data, the slave printer starts a rendering process, details of which will be described later. As is apparent from the following description, the rendering process order in the master printer is an ascending page order of page numbers 1, 2, . . . . In contrast with the order by the master printer, the rendering order by the slave printer is a descending page order of page numbers Pmax, Pmax−1, Pmax−2 . . . . The slave printer notifies the master printer of a page number during rendering as a message and information. In another task, the master printer receives the notification of a page number during rendering from the slave printer. In this task, every time the master printer receives a message representing a rendering page number from the slave printer, it overwrites (updates) the information at a preset address position in the RAM 2002.

Figure 11:
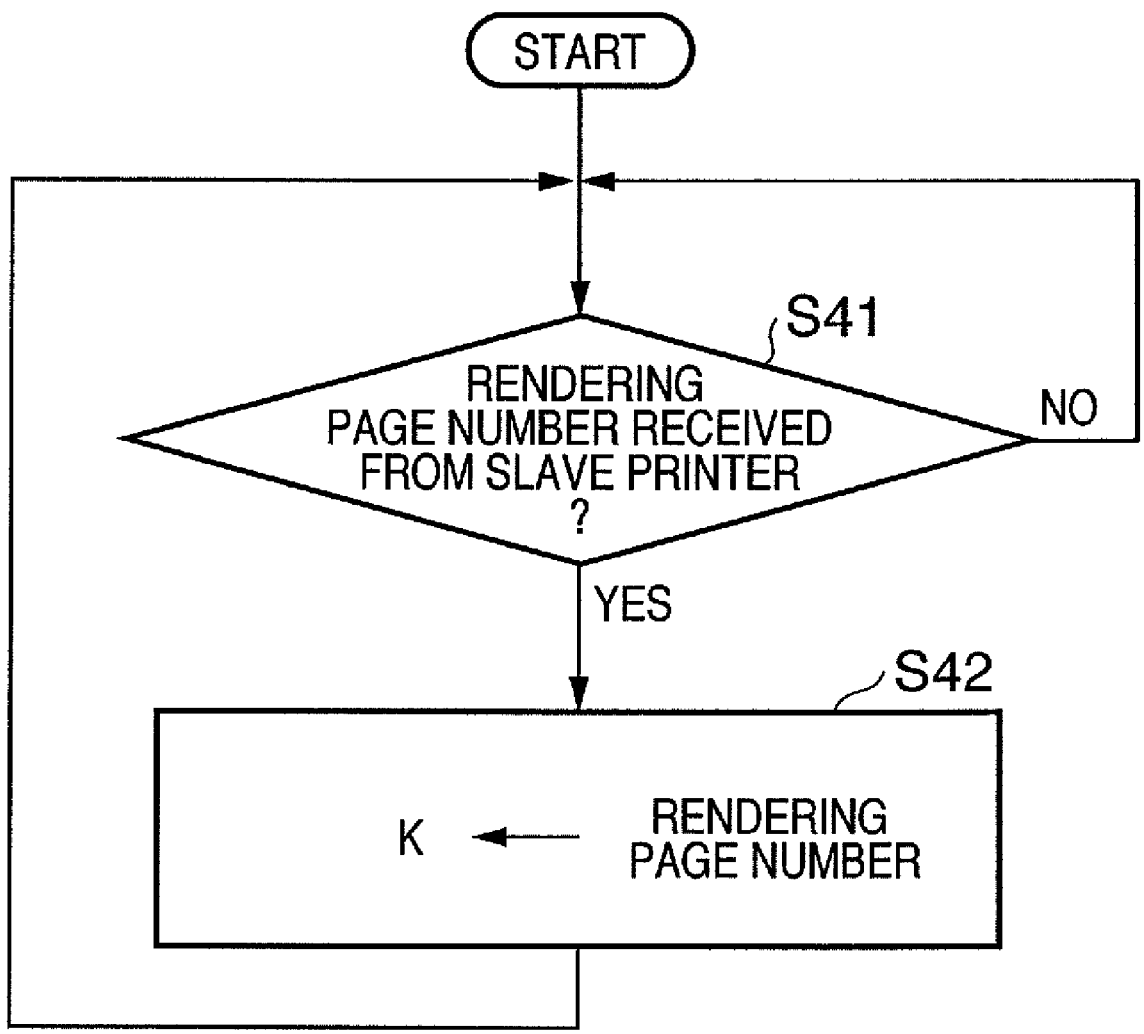
FIG. 11 is a flowchart showing a process to receive a message containing a page number during rendering by the image forming apparatus from another image forming apparatus in the embodiment.

FIG. 11 shows the process procedures of this task by the master printer.

In step S41, the master printer waits until it receives a message representing a page number during rendering from the slave printer. Upon reception of the message, the process advances to step S42 to overwrite the page number in the message at the address position of the variable K allocated in the RAM 2002.

The slave printer also receives a page number during rendering from the master printer and updates it in a task different from the rendering process in the slave printer. This task is almost the same as that in FIG. 11.

Figure 7:
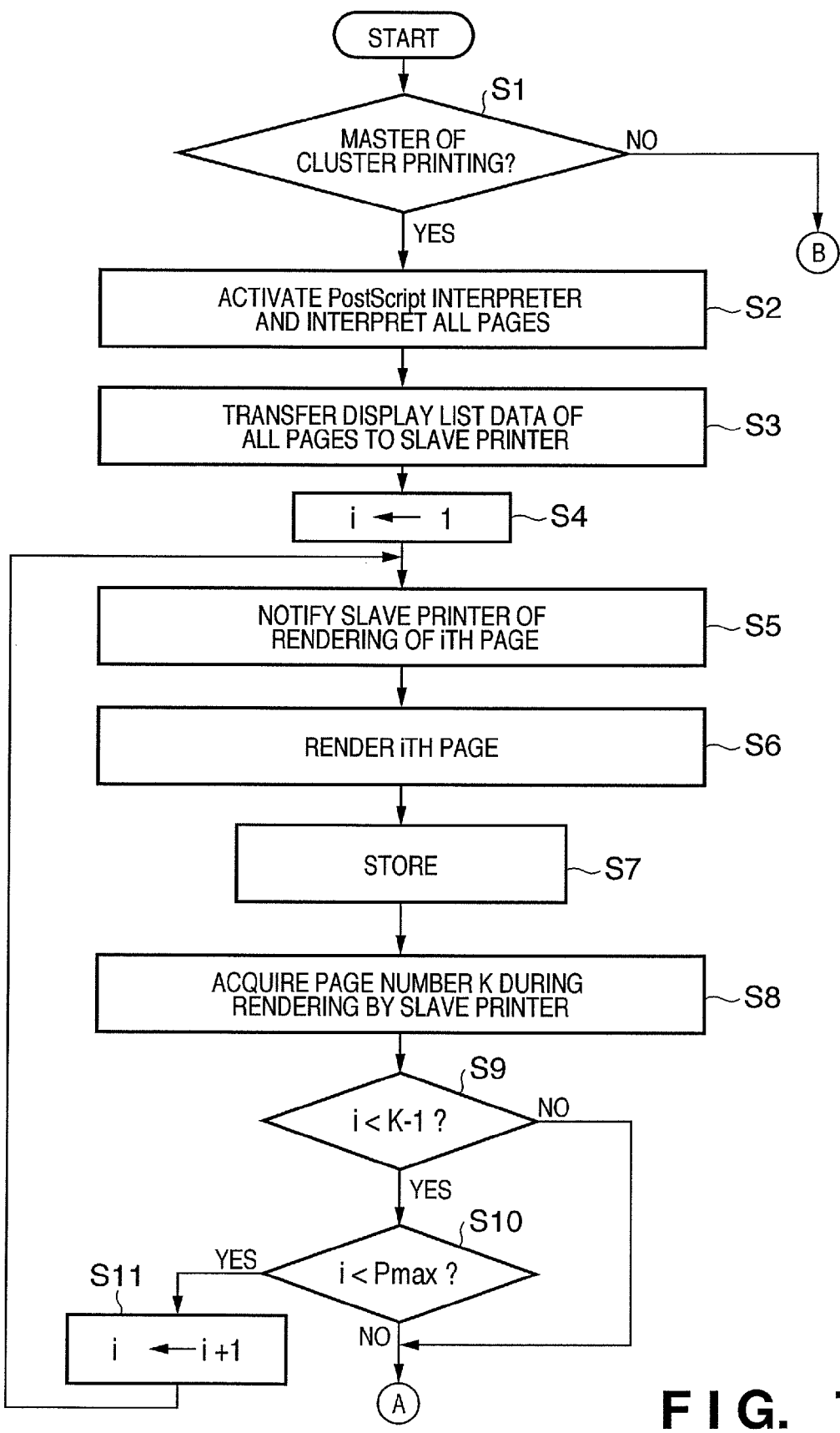
FIG. 7 is a flowchart showing the process procedures of the image forming apparatus in cluster printing in the embodiment.
Figure 8:
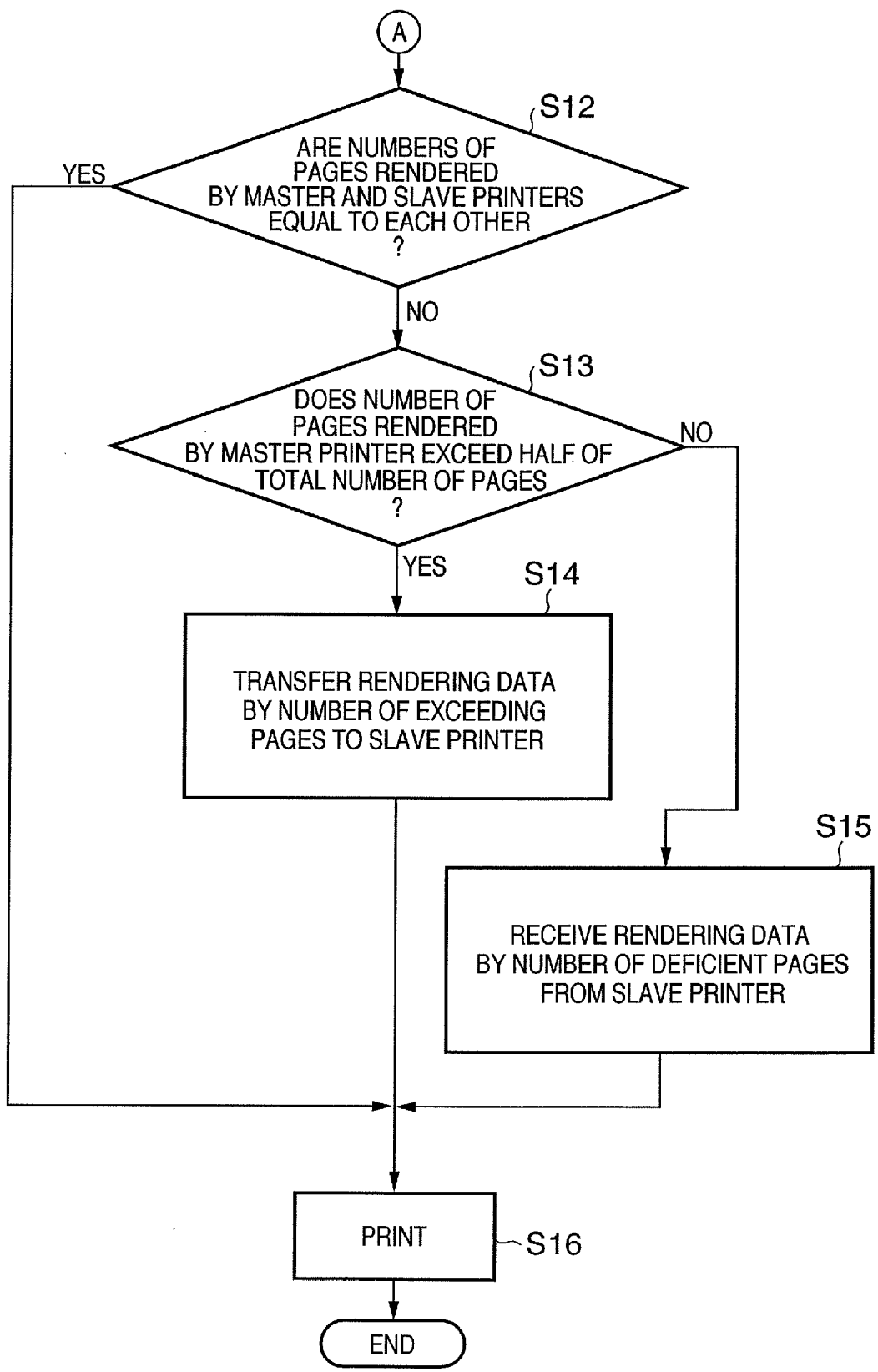
FIG. 8 is a flowchart showing the process procedures of the image forming apparatus in cluster printing in the embodiment.
Figure 9:
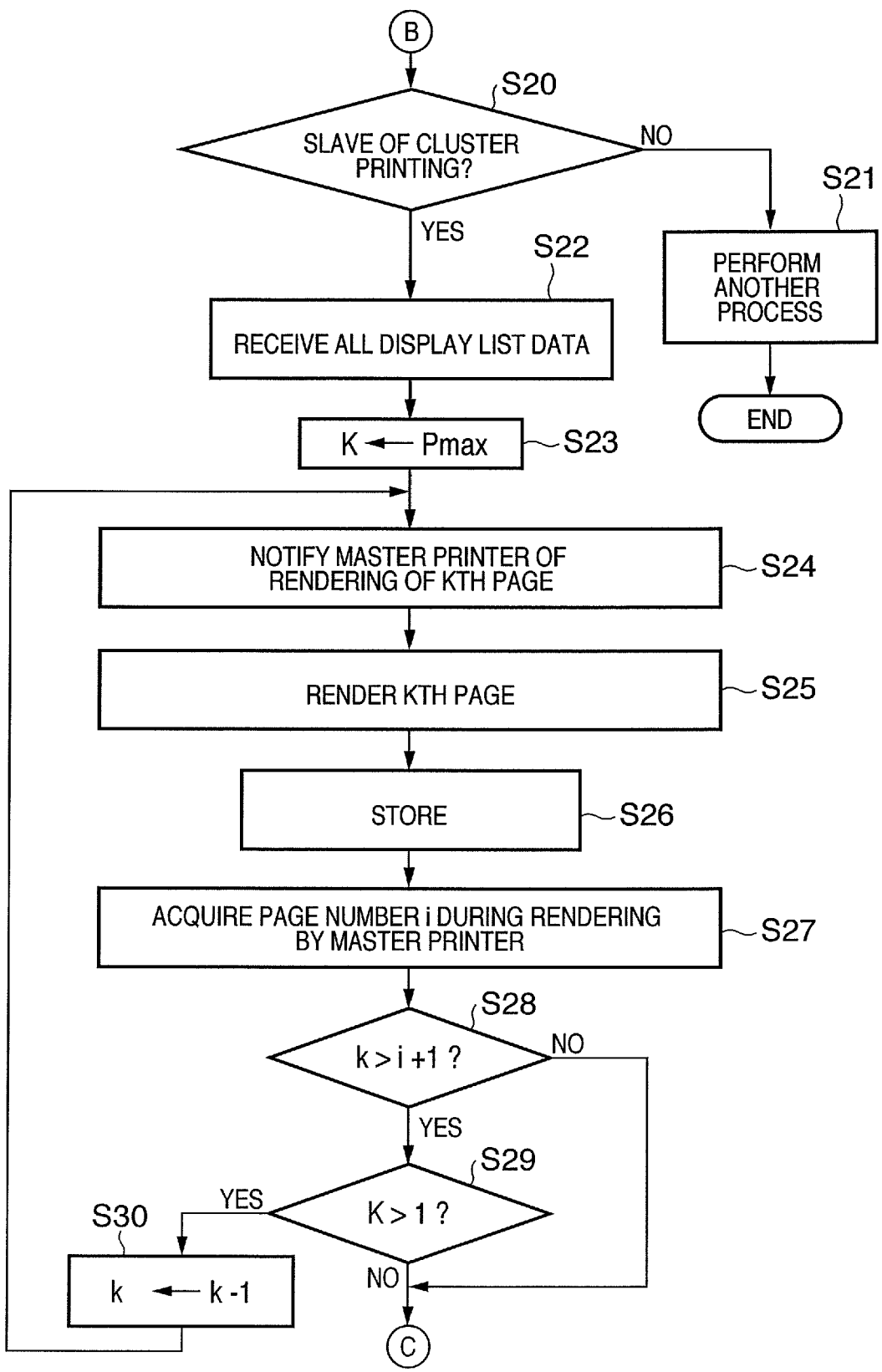
FIG. 9 is a flowchart showing the process procedures of the image forming apparatus in cluster printing in the embodiment.

Referring back to the flowchart of FIG. 7, upon completion of transferring the display list data of all pages to the slave printer, the process advances to step S4 to substitute "1" as an initial value into the variable i. The process advances to step S5 to generate a message representing that the rendering process for the page number i is in progress, and notify (transmit) the slave printer of the message. After this notification, the process advances to step S6 to read display list data of the ith page among the display list data stored in the HDD 2004 and perform rendering. Upon completion of rendering the ith page of interest, the process advances to step S7 to store bitmap image data as the rendering result in the HDD 2004.

The process advances to step S8 to acquire the page number K during rendering by the slave printer from the RAM 2002.

In step S9, the master printer compares the next page number i subjected to rendering with a value calculated by subtracting "1" from the page number K during rendering by the slave printer, determining whether "i<K−1". This means determining whether the master printer has already rendered a page to be rendered next by the slave printer. In other words, this means determining whether the slave printer has started or completed rendering a page to be rendered next by the master printer.

In step S9, the master printer determines not "i=K−1?" but "i<K−1?" because, while one printer renders one page, the other printer may become able to render two or more pages.

If "YES" in step S9, at least the slave printer has not started rendering a page to be rendered next by the master printer, and the process advances to step S10. In step S10, the master printer determines whether the variable i=Pmax, i.e., rendering of the final page is complete. If "i<Pmax", the process advances to step S11 to increment the variable i by "1" and repeat processes in step S5 and subsequent steps.

If "NO" in step S9, i.e., the master printer determines that the slave printer is rendering or has already rendered a page to be rendered next by the master printer, the process advances to step S12. Also, if "NO" in step S10, the process advances to step S12.

It should be noted that, when the process advances to step S12, rendering data of all pages are obtained by adding the rendering results of the master and slave printers.

In step S12, the master printer determines whether the number of pages rendered by the master printer is almost equal to that of pages rendered by the slave printer.

If the master printer determines that the numbers of rendered pages are equal to each other, the number of pages rendered by each of the master and slave printers is half the total number Pmax of pages. The embodiment assumes that the printing units of the master and slave printers have the same print speed. Thus, it is promised that the master and slave printers will complete printing at almost the same timing. The process advances to step S16 to read bitmap image data sequentially from pages 1, 2, . . . out of rendering results stored in the HDD 2004, sequentially print pages 1, 2, . . . , and end a series of cluster print processes.

If "NO" in step S12, the process advances to step S13. In step S13, the master printer determines whether the number of pages (the value of the variable i) rendered by the master printer exceeds half the total number of pages.

If the master printer determines in step S13 that the number of pages rendered by the master printer exceeds half the total number of pages, the process advances to step S14 to transfer rendering results by the number of pages exceeding half the total number of pages to the slave printer. The master printer transfers rendering data from the final page toward the start page held by it. For example, when Pmax=100 and the master printer has rendered pages up to page number "55", the master printer transfers the rendering results of page numbers 51, 52, 53, 54, and 55 to the slave printer.

If "NO" in step S13, the number of pages rendered by the master printer is smaller than half the total number of pages. In order to render half the total number of pages by the master printer, the master printer receives deficient pages from the slave printer and stores them in the HDD 2004 in step S15. The master printer receives rendering data from the start page toward the final page held by the slave printer. For example, when Pmax=100 and the master printer has rendered pages up to page number "45", the master printer receives rendering data of page numbers 46, 47, 48, 49, and 50 from the slave printer.

As a result of the process in step S14 or S15, at least rendering data up to an intermediate page number of all pages from the start page exist in the HDD 2004 of the master printer. In step S16, the master printer prints the first half of all pages, ending a series of cluster print processes.

A case where the total number Pmax of pages is odd will be complemented. When the total number of pages is odd, either of the master and slave printers must print one more page.

In step S12, if the total number Pmax of pages is odd, the master printer determines whether the difference between the numbers of pages rendered by the master and slave printers is "1" or less. The variable i represents the number of pages rendered by the master printer, and "Pmax−K+1" represents that of pages rendered by the slave printer. In step S12, therefore, the master printer actually determines whether Condition: $|i-(Pmax-K+1)| \leq 1$ (where |x| is the absolute value of x).

The transmission data amount of rendering data in step S14 or S15 is desirably small.

For example, when Pmax=101 and the master printer has rendered pages up to page number "55", the master printer transfers the rendering results of page numbers 52, 53, 54, and 55 to the slave printer in step S14.

When Pmax=101 and the master printer has rendered pages up to page number "45", the master printer receives rendering data of page numbers 46, 47, 48, 49, and 50 from the slave printer in step S15.

In short, when the total number Pmax of pages is odd, a printer which renders more than half pages prints one more page in comparison with the other printer.

As already described above, the image forming apparatus 200 in the embodiment also functions as a slave printer. Processes by the image forming apparatus 200 serving as a slave printer start when receiving display list data from another image forming apparatus serving as a master, and a job ticket describing information which instructs the image forming apparatus 200 to function as a slave. That is, the image forming apparatus 200 functions as a slave printer when "NO" in step S1 of FIG. 7, the process advances to step S20 of FIG. 9, and "YES" in step S20. If "NO" even in step S20, the image forming apparatus 200 is to perform a normal print process single-handedly, so the process advances to step S21 to execute the process.

Processes by the image forming apparatus 200 serving as a slave printer are those in step S22 and subsequent steps after "YES" in step S20.

As described above, the image forming apparatuses 200, 220, and 230 have the same functions. In the above description of FIGS. 7 and 8, the image forming apparatus 200 functions as a master printer. Processes in step S22 and subsequent steps are technically easily understandable by describing them as processes by an image forming apparatus other than the image forming apparatus 200. In the following description, the image forming apparatus 220 (or image forming apparatus 230) designated as a slave printer performs processes in step S22 and subsequent steps.

In step S22, the slave printer receives display list data of all pages from the master printer (image forming apparatus 200), and stores them in the HDD. The slave printer sets Pmax as the variable K representing a page number subjected to rendering, i.e., sets the final page as the first rendering target.

In step S24, the slave printer notifies the master printer that the slave printer is to render the Kth page. The slave printer renders the Kth page in step S25, and stores the Kth page as bitmap data of the page number K in the HDD in step S26. In step S27, the slave printer acquires the page number i during rendering by the master printer. It has already been described that reception of a page number from the master printer and the update process are different tasks.

The process advances to step S28 to determine whether "K>i+1", i.e., whether the slave printer has already rendered a page to be rendered next by the master printer. In other words, this means determining whether the master printer has started or completed rendering a page to be rendered next by the slave printer.

If "YES" in step S28, at least the master printer has not started rendering a page to be rendered next by the slave printer. Hence, the process advances to step S29 to determine whether the relation between the variable K and "1" is "K>1", i.e., rendering of the start page is complete. If "K>1", the process advances to step S30 to decrement the variable K by "1" and repeat processes in step S24 and subsequent steps.

Figure 10:
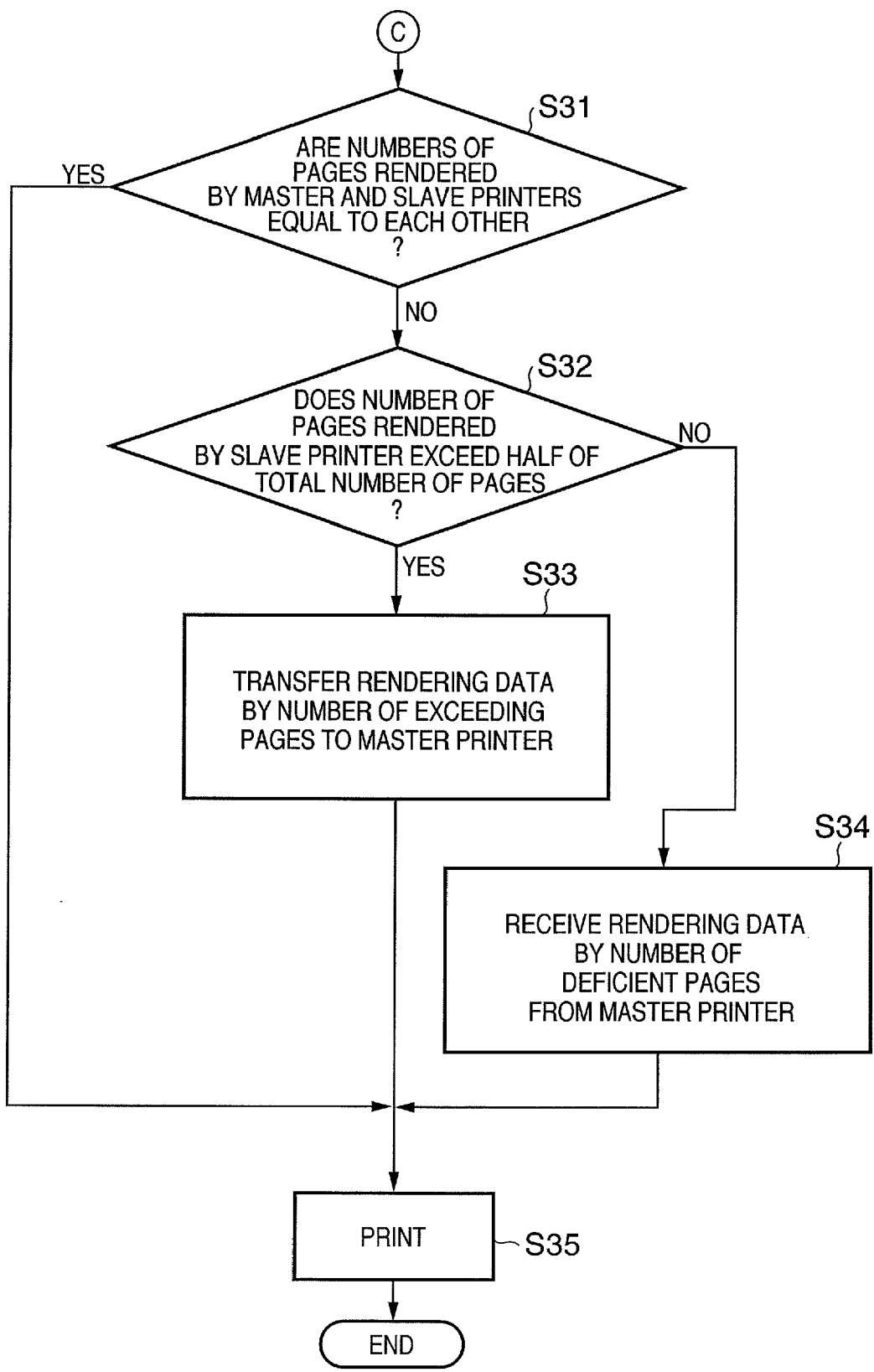
FIG. 10 is a flowchart showing the process procedures of the image forming apparatus in cluster printing in the embodiment.

If "NO" in step S28, i.e., the slave printer determines that the master printer is rendering or has already rendered a page to be rendered next by the slave printer, the process advances to step S31 in FIG. 10. Also, if "NO" in step S29, the process advances to step S31.

In step S31, the slave printer determines whether the number of pages rendered by the master printer is almost equal to that of pages rendered by the slave printer. This determination is the same as the above-described process in step S12.

If the slave printer determines that the numbers of rendered pages are equal to each other, the number of pages rendered by each of the master and slave printers is half the total number Pmax of pages. The process advances to step S35 to print pages of the second half out of all pages among rendering results stored in the HDD.

For example, when Pmax=100 (even) and the process advances from step S31 to step S35, the slave printer reads out rendering data from the HDD in an order of page numbers 51, 52, . . . and prints them in an order of page numbers 51, 52, . . . .

For example, when Pmax=101 and K=51, the slave printer prints rendering data in an order of page numbers 51, 52, . . . , 101 (the number of print pages is "51"). When Pmax=101 and K=52, the slave printer prints rendering data in an order of page numbers 52, 53, . . . , 101 (the total number of pages is "50").

If "NO" in step S31, the process advances to step S33. In step S33, the slave printer determines whether the number (Pmax−K+1) of pages rendered by the slave printer exceeds half the total number of pages.

If the slave printer determines in step S31 that the number of pages rendered by the slave printer exceeds half the total number of pages, the process advances to step S34 to transfer rendering results by the number of pages exceeding half the total number of pages to the master printer. The slave printer transfers rendering data from the start page toward the final page held by it. For example, when Pmax=100 and the slave printer has rendered pages up to page number "45", the slave printer transfers the rendering results of page numbers 45, 46, 47, 48, 49, and 50 to the master printer.

Even when Pmax=101 and the slave printer has rendered pages up to page number "45", the slave printer transfers the rendering results of page numbers 45, 46, 47, 48, 49, and 50 to the master printer. The slave printer does not transfer the rendering result of page number "51" in order to reduce the transfer data amount.

If "NO" in step S33, the number of pages rendered by the slave printer is smaller than half the total number of pages. In order to render half the total number of pages by the slave printer, the slave printer receives deficient pages from the master printer and stores them in the HDD in step S34. The slave printer receives rendering data from the final page toward the start page held by the master printer.

For example, when Pmax=100 and the slave printer has rendered pages up to page number "55", the slave printer receives rendering data of page numbers 51, 52, 53, and 54 from the master printer.

When Pmax=101 and the slave printer has rendered pages up to page number "55", the slave printer transfers the rendering results of page numbers 52, 53, and 54 to the master printer. The slave printer does not receive the rendering result of page number "51" in order to reduce the transfer data amount.

As a result of the process in step S33 or S34, at least rendering data by the number of pages of the second half out of all pages exist in the HDD of the slave printer. In step S35, the slave printer prints the first half of all pages, ending a series of cluster print processes.

Figure 12:
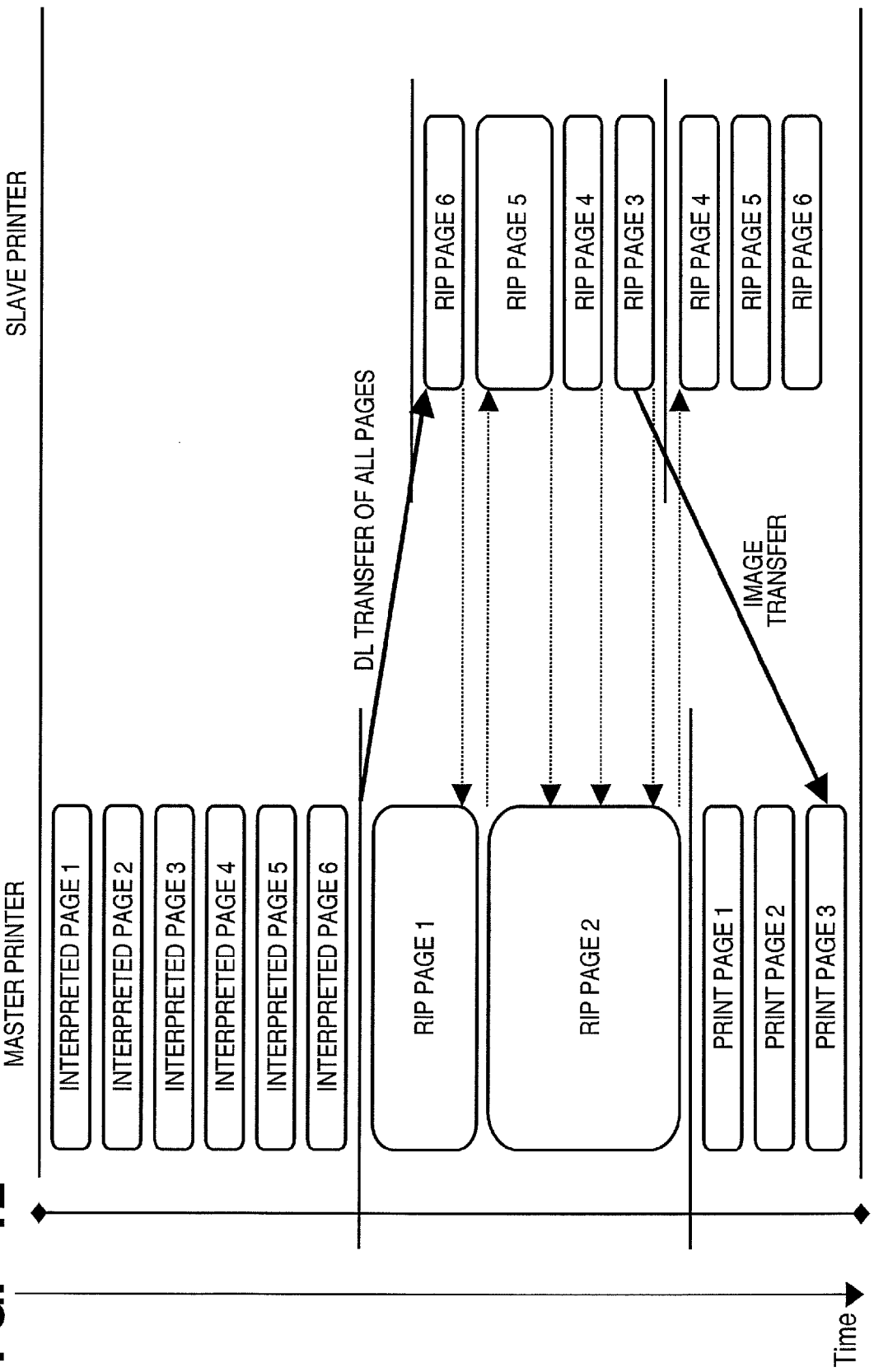
FIG. 12 is a chart showing the process sequences of two printers in the first embodiment.

FIG. 12 shows the timing sequences of the master and slave printers when executing cluster printing described with reference to FIGS. 7 to 11.

In this example, the master printer performs a RIP process for two start pages, and the slave printer performs a RIP process for the four remaining pages because the RIP process for the first and second pages out of six pages is heavy. The number of print pages is made equal between the master and slave printers by transferring the image of the third page having undergone RIP from the slave printer to the master printer. Consequently, the print completion timings of the master and slave printers almost coincide with each other.

FIG. 12 shows a 6-page print job, and the effects of the embodiment will apparently become more significant for printer data of several hundred or thousand pages. For a print job of odd-numbered pages, even a maximum difference between the print completion timings of two printers can be suppressed to the print time of one page.

The embodiment has exemplified PostScript, but is also applicable to another page description language as long as data of the page description language can be converted into intermediate data (display list data) suitable for a rendering process (or RIP process).

In the embodiment, the rendering order by the master printer is the ascending page order, and that by the slave printer is the descending page order, but vice versa.

When transferring rendering data from one printer to the other, the rendering data may be compressed and coded before transfer. This compression coding is desirably lossless coding.

As has been described above, the embodiment can minimize the difference between timings when printing of pages assigned to each printer is complete in cluster printing.

In the embodiment, the numbers of print sheets (print speeds) per unit time by the printing units of the image forming apparatuses 200, 220, and 230 are equal. However, when the print speed of the master is "1" and that of the slave printer is "2", the number of pages to be printed by the master printer and that of pages to be printed by the slave printer may be set to 1:2. That is, letting Pmax be the total number of pages, the master printer may hold rendering data by the number Pmax/3 of pages and the slave printer may hold rendering data by the number Pmax×2/3 of pages. To implement this, the job ticket describes the speed ratio between the printing units of the master and slave printers or the numbers of pages to be printed by the master and slave printers. The slave printer needs to know the speed ratio or distribution number. For this purpose, information on the speed ratio or distribution number is described when transferring display list data from the master printer to the slave printer.

Second Embodiment

The printing system according to the embodiment (first embodiment) distributes the RIP load by transferring generated display list data of all pages from the master printer to the slave printer. The RIP load is also distributable by transferring display list data of each page. This example will be explained as the second embodiment.

Figure 13:
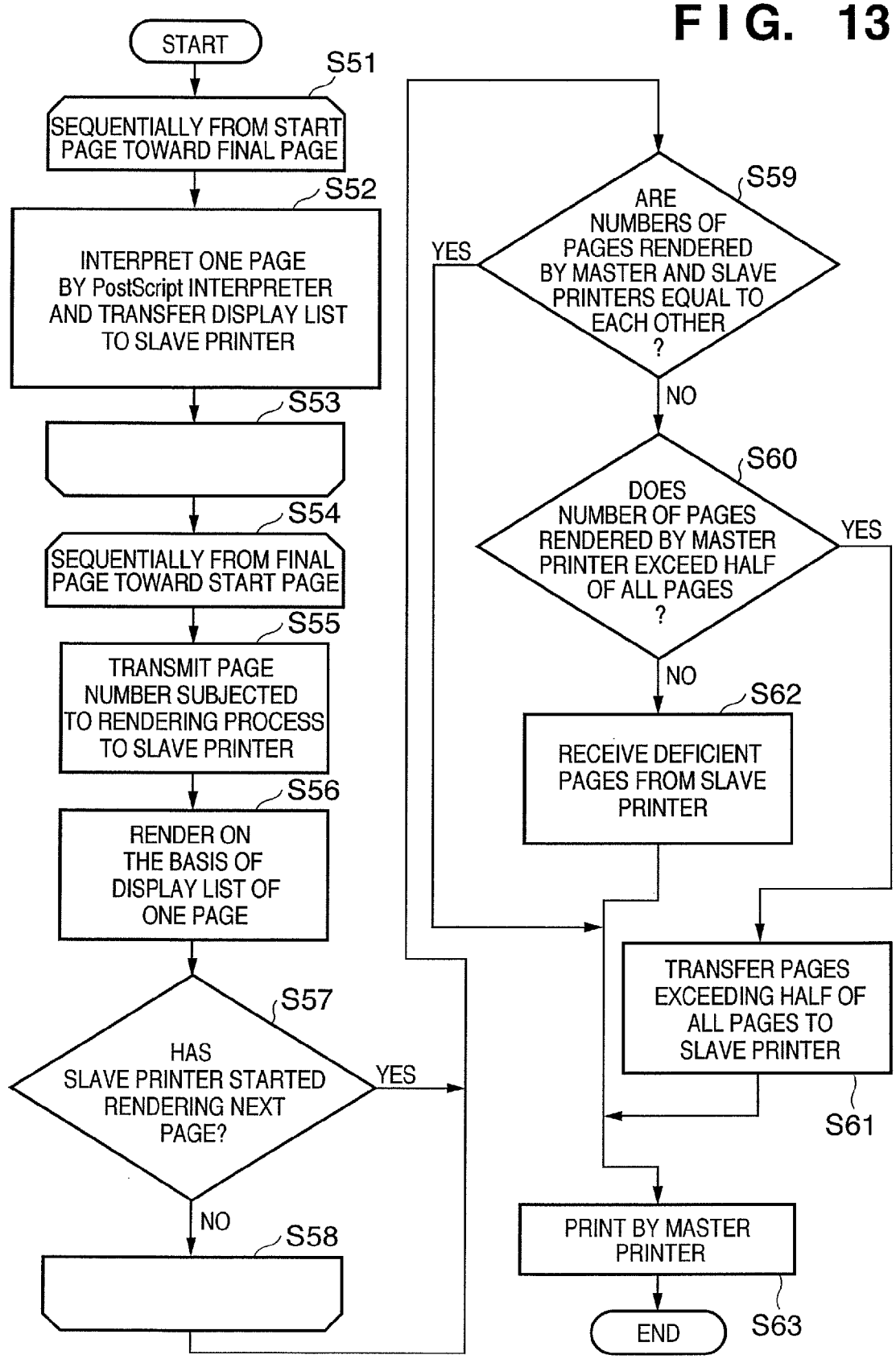
FIG. 13 is a flowchart showing process procedures when the image forming apparatus functions as a master printer in the second embodiment.
Figure 14:
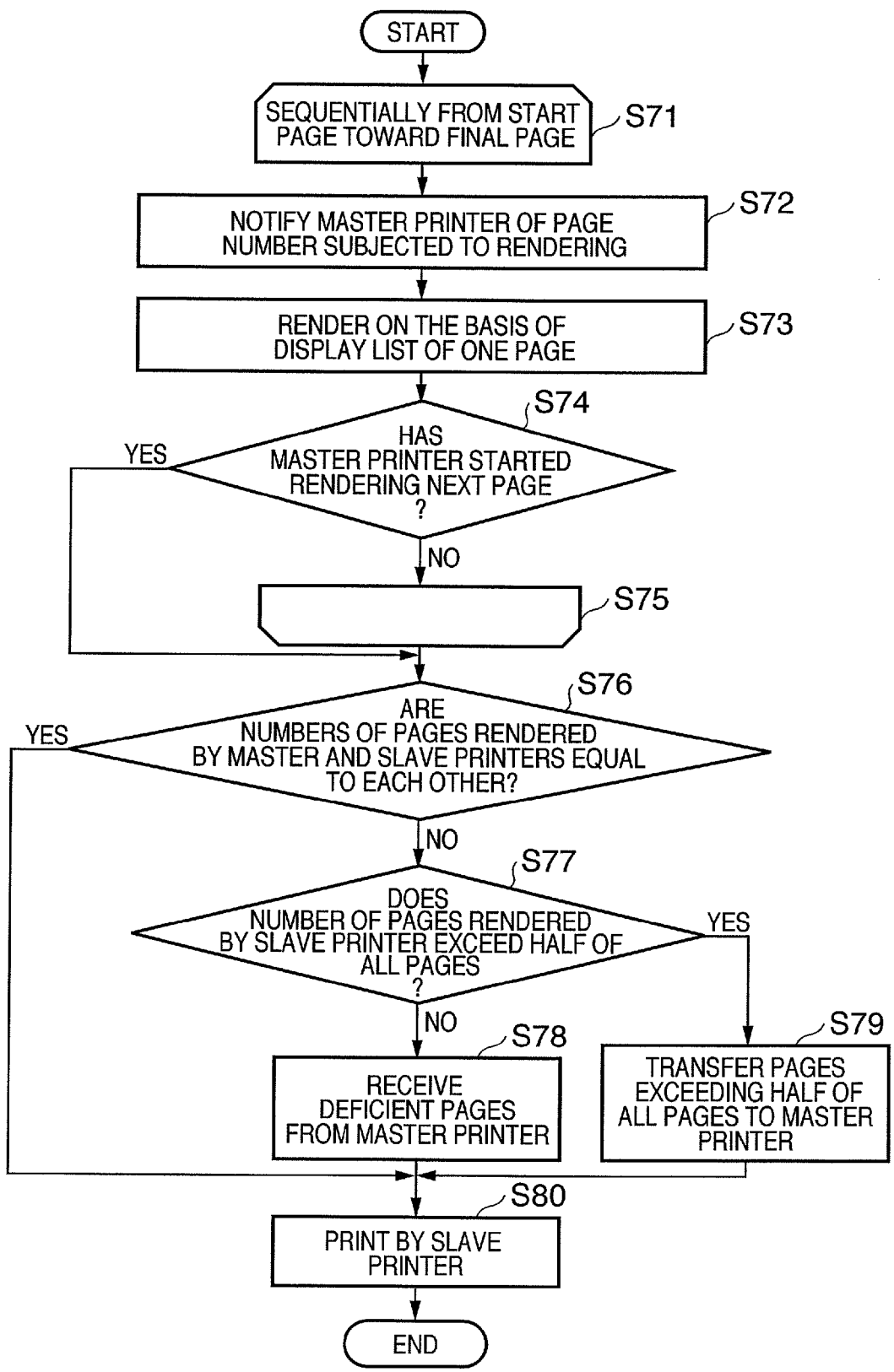
FIG. 14 is a flowchart showing process procedures when the image forming apparatus functions as a slave printer in the second embodiment.

Details of the second embodiment have been described in the first embodiment, and an outline of the process procedures of the master and slave will be explained with reference to the flowcharts of FIGS. 13 and 14.

The process procedures of the master printer in the second embodiment will be explained with reference to the flowchart of FIG. 13. A Job Manager module 1520 and Printer Manager module 1526 in FIG. 5 execute a program shown in the flowchart of FIG. 13. As described in the first embodiment, the job ticket designates whether to perform cluster printing, and when cluster printing is to be performed, designates a slave printer. The Job Manager module 1520 is notified via a Control API module 1519 of the result of interpretation by a Job Ticket Parser 1531.

The master printer executes a loop process in steps S51 to S53. In this loop process, from the start page to the final page, the master printer repeats a process to activate a PostScript interpreter, interpret one page, and transfer generated display list data to the slave printer. The master printer does not discard transferred display list data but spools it in the HDD of the master printer. The Job Manager module 1520 executes up to step S53.

Then, the master printer executes a loop process in steps S54 to S58. In this loop process, the master printer repetitively executes, from the final page toward the start page, a process to perform rendering on the basis of display list data of one page and a process to notify the slave printer of a page number during rendering. During rendering, the master printer determines whether the slave printer is rendering a page to be rendered next. If the master printer determines that the slave printer is rendering the next page, the process escapes from this loop.

Similar to the first embodiment, whether the slave printer has started rendering is confirmed by message communication with the slave printer via the network.

The process advances to step S59 to determine whether the numbers of pages rendered by the master and slave printers are almost equal to each other. This determination is the same as steps S12 and S31 in the first embodiment. If the master printer determines that the numbers of rendered pages are equal to each other, the process advances to step S63 to print pages from the start page on the basis of rendering data stored in the HDD. More specifically, when the print job has 100 pages in total, the HDD stores rendering data of page 51 and subsequent pages, and the master printer prints pages in an order of pages 51, 52, . . . .

If the master printer determines in step S59 that the numbers of pages rendered by the master and slave printers are different from each other, the process advances to step S60. In step S60, the master printer determines whether the number of pages rendered by the master printer exceeds half of all pages. If YES in step S60, the process advances to step S61; if NO, to step S62.

If the process advances to step S61, the master printer transfers rendered image data of pages exceeding half of all pages of the print job to the slave printer. In the second embodiment, the rendering order of pages by the master printer is the descending page order. When the number of pages of the print job is 100 and the master printer has rendered up to the 45th page, the master printer transfers the rendering results of pages 45, 46, 47, 48, 49, and 50 to the slave printer.

If the process advances to step S62, the master printer receives rendered image data deficient for half of all pages of the print job from the slave printer. When the number of pages of the print job is 100 and the master printer has rendered up to the 55th page, the master printer receives the rendering results of pages 51, 52, 53, and 54 from the slave printer and stores them in the HDD.

As a result of the process in step S61 or S62, at least the HDD of the master printer stores rendering data of pages of the second half out of all pages of the print job. The process advances to step S63 to print the pages of the second half in the ascending page order.

The Printer Manager module 1526 executes processes in steps S54 to S63. In step S59, the master printer checks whether the numbers of pages rendered by the master and slave printers are equal to each other. In step S60, the master printer checks whether the number of rendered pages reaches half of all pages. These processes assume that the printer engines of the master and slave printers have the same output speed. When the master and slave printers have different engine speeds, the numbers of pages to be rendered may change in accordance with the engine speed ratio between the two printers.

The process procedures of the slave printer in the second embodiment will be explained with reference to the flowchart of FIG. 14. The Printer Manager module 1526 in FIG. 5 executes a program shown in the flowchart of FIG. 14. The job ticket designates the operation of the slave printer in cluster printing. The Job Manager module 1520 and Printer Manager module 1526 are notified via the Control API module 1519 of the result of interpretation by the Job Ticket Parser 1531.

In a loop process in steps S71 to S75, the slave printer repeats a rendering process complying with display list data received from the master printer, and a process to notify the master printer of a page number during rendering. Since the master printer transfers display list data from the start page toward the final page, the rendering order is an ascending page order of pages 1, 2, . . . . In this loop process, the slave printer also determines whether the master printer has started rendering a page to be rendered next by the slave printer. If the slave printer determines that the master printer has started rendering a page to be rendered next, or pages have been rendered up to the final page, the process escapes from this loop process.

Whether the master printer has started rendering is confirmed by message communication with the master printer via the network.

After escaping from the loop process in steps S71 to S75, the process advances to step S76 to determine whether the numbers of pages rendered by the master and slave printers are almost equal to each other. This determination is the same as steps S12 and S31 in the first embodiment. If the slave printer determines that the numbers of rendered pages are equal to each other, the process advances to step S80 to print pages from the start page on the basis of rendering data stored in the HDD. More specifically, when the print job has 100 pages in total, the HDD stores rendering data of pages 1, 2, . . . , 50, and the slave printer prints pages in an order of pages 1, 2, . . . .

If the slave printer determines in step S76 that the numbers of pages rendered by the master and slave printers are different from each other, the process advances to step S77. In step S77, the slave printer determines whether the number of pages rendered by the slave printer exceeds half of all pages. If NO in step S77, the process advances to step S78; if YES, to step S79.

If the process advances to step S78, this means that rendering results in the slave printer do not reach half of all pages of the print job. The master printer transmits deficient rendered image data, and the slave printer receives them. When the number of pages of the print job is 100 and the slave printer has rendered up to the 45th page, the slave printer receives the rendering results of pages 46, 47, 48, 49, and 50 from the master printer and stores them in the HDD.

If the process advances to step S79, the slave printer transfers rendered image data of pages exceeding half of all pages of the print job to the master printer. In the second embodiment, the rendering order of pages by the master printer is the descending page order. When the number of pages of the print job is 100 and the master printer has rendered up to the 55th page, the slave printer transmits the rendering results of pages 51, 52, 53, and 54 to the master printer.

As a result of the process in step S78 or S79, at least the HDD of the slave printer stores rendering data of pages of the first half out of all pages of the print job. The process advances to step S80 to print the pages of the first half in the ascending page order.

In this manner, the master and slave printers can achieve a pipeline process by transferring display list data of each page, which is interpreted and generated by the master printer, to the slave printer and performing rendering. After the master printer ends page interpretation, it also starts rendering pages from the final page. After the two printers render consecutive pages numbers, their rendering processes end, efficiently distributing the RIP load. The print load is also efficiently distributable by adjusting the distribution of image data having undergone RIP.

Figure 15:
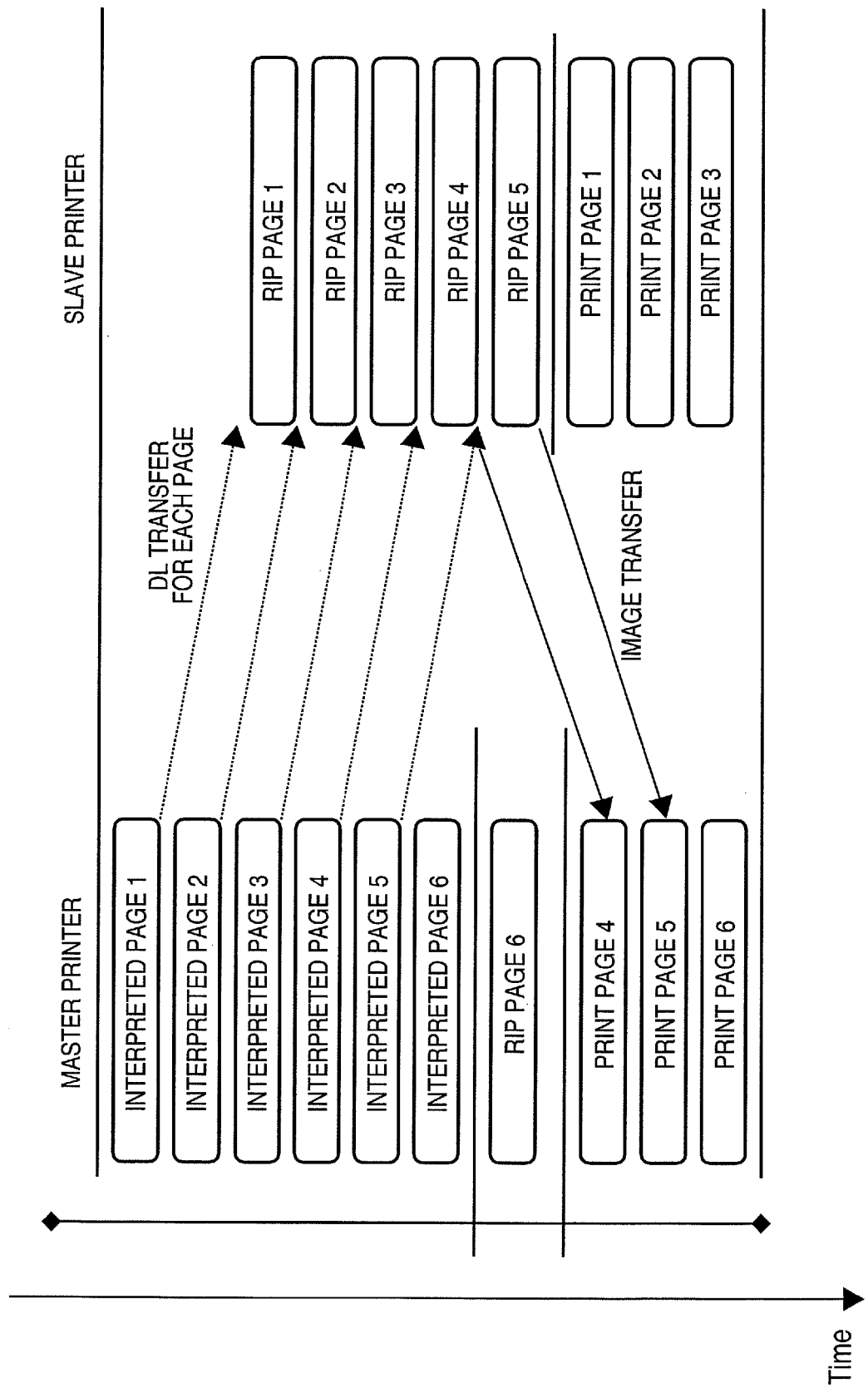
FIG. 15 is a chart showing the process sequences of two printers in the second embodiment.

FIG. 15 shows an example of the sequence when executing cluster printing described with reference to the flowcharts of FIGS. 13 and 14. In this example, a page interpretation process by the master printer and a rendering process by the slave printer are parallel-executed. In FIG. 15, the slave printer performs a RIP process up to the fifth page out of six pages. The master printer performs a RIP process for the sixth final page, and the slave printer transfers images of the fourth and fifth pages having undergone RIP to the master printer. This equally divides the number of print pages into three between the master and slave printers, distributing the print load. Printer data of several pages have been exemplified for descriptive convenience, and the effects of the second embodiment will apparently become more significant for printer data of several thousand pages.

Third Embodiment

The printing system according to the first embodiment distributes the RIP load by transferring generated display list data of all pages from the master printer to the slave printer. The RIP load is also distributable by transferring PDL (Page Description Language) data described in a page independent type PDL. This example will be explained as the third embodiment. The third embodiment will exemplify PDF as typical page independent type PDL data.

Figure 16:
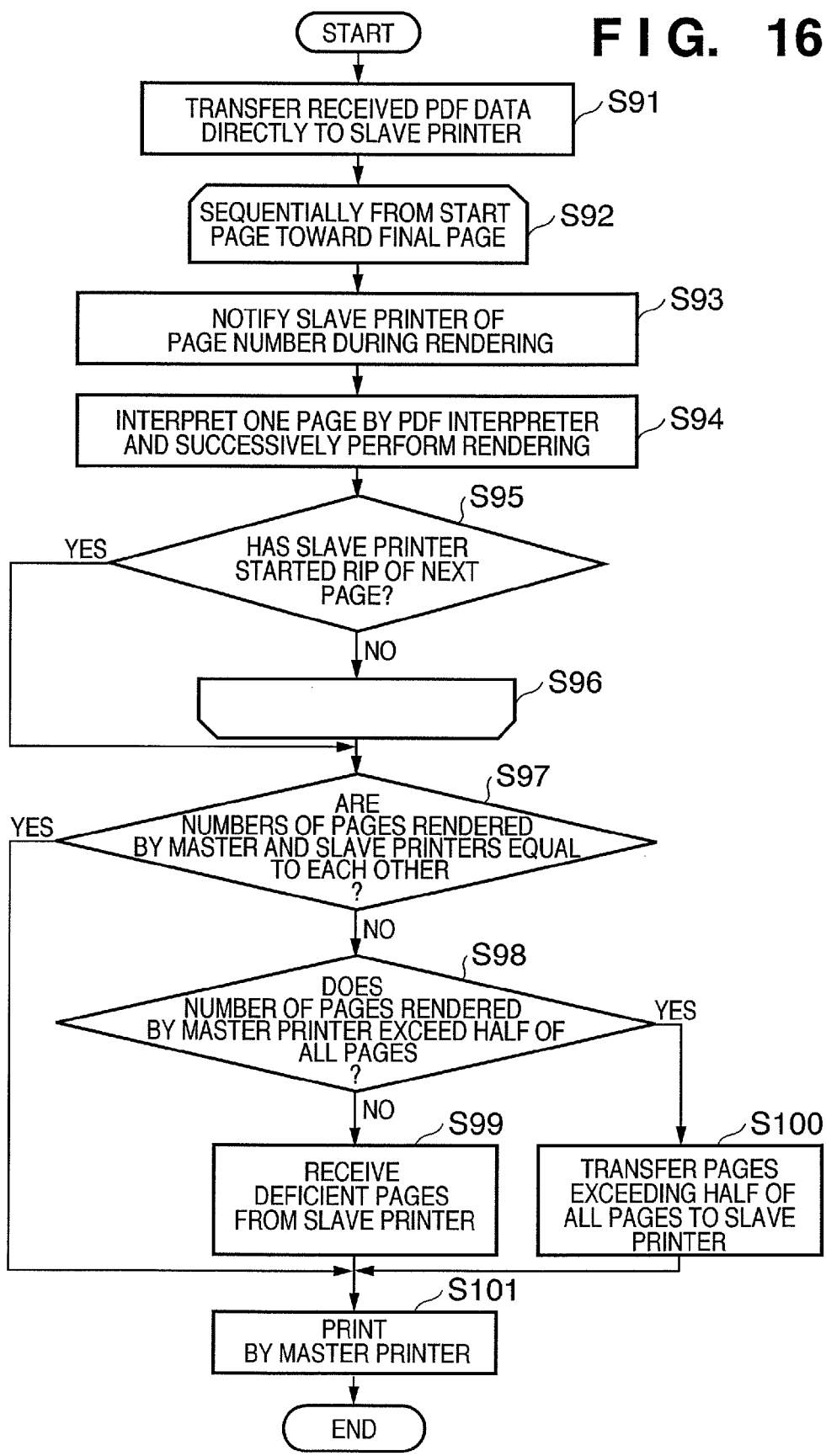
FIG. 16 is a flowchart showing process procedures when the image forming apparatus functions as a master printer in the third embodiment.

The process procedures of the master printer in the third embodiment will be explained with reference to the flowchart of FIG. 16. A Job Manager module 1520 and Printer Manager module 1526 in FIG. 5 execute a program shown in the flowchart of FIG. 16. The job ticket designates whether to perform cluster printing, and when cluster printing is to be performed, designates a slave printer. The Job Manager module 1520 is notified via a Control API module 1519 of the result of interpretation by a Job Ticket Parser 1531.

In step S91, the master printer transfers received PDF data to the slave printer. The transferred PDF data remains in the HDD of the master printer without erasure.

The master printer executes a loop process in steps S92 to S96. In this loop process, the master printer successively interprets one page by a PDF interpreter to generate display list data, and executes rendering. The master printer executes this process sequentially from the start page toward the final page. During this loop process, the master printer notifies the slave printer of page numbers during interpretation and rendering. During rendering, the master printer determines whether the slave printer is rendering a page to be rendered next. If the master printer determines that the slave printer is rendering the next page, the process escapes from this loop. The process also escapes from this loop when the page rendered by the master printer is the final one.

The process by the PDF interpreter is not so different from that by the PostScript interpreter described with reference to FIG. 6 except for the process by the language processing unit, and a description thereof will be omitted.

After escaping from the loop process in steps S92 to S96, the process advances to step S97 to determine whether the numbers of pages rendered by the master and slave printers are almost equal to each other. This determination is the same as steps S12 and S31 in the first embodiment. If the master printer determines that the numbers of rendered pages are equal to each other, the process advances to step S101 to print pages from the start page on the basis of rendering data stored in the HOD. More specifically, when the print job has 100 pages in total, the HDD stores rendering data of pages 1, 2, . . . , 50, and the master printer prints pages in an order of pages 1, 2, . . . .

If the master printer determines in step S97 that the numbers of pages rendered by the master and slave printers are different from each other, the process advances to step S98. In step S98, the master printer determines whether the number of pages rendered by the master printer exceeds half of all pages. If NO in step S98, the process advances to step S99; if YES, to step S100.

If the process advances to step S99, this means that rendering results in the master printer do not reach half of all pages of the print job. The slave printer transmits deficient rendered image data, and the master printer receives them. When the number of pages of the print job is 100 and the slave printer has rendered up to the 45th page, the master printer receives the rendering results of pages 46, 47, 48, 49, and 50 from the slave printer and stores them in the HDD.

If the process advances to step S100, the master printer transfers rendered image data of pages exceeding half of all pages of the print job to the slave printer. The rendering order of pages by the slave printer is the descending page order. When the number of pages of the print job is 100 and the master printer has rendered up to the 55th page, the master printer transmits the rendering results of pages 51, 52, 53, and 54 to the slave printer.

As a result of the process in step S99 or S100, at least the HDD of the master printer stores rendering data of pages of the first half out of all pages of the print job. The process advances to step S101 to print the pages of the first half in the ascending page order.

In step S97, the master printer checks whether the numbers of pages rendered by the master and slave printers are equal to each other. In step S98, the master printer checks whether the number of rendered pages reaches half of all pages. These processes assume that the printer engines of the master and slave printers have the same output speed. When the master and slave printers have different engine speeds, the numbers of pages to be rendered may change in accordance with the engine speed ratio between the two printers.

Figure 17:
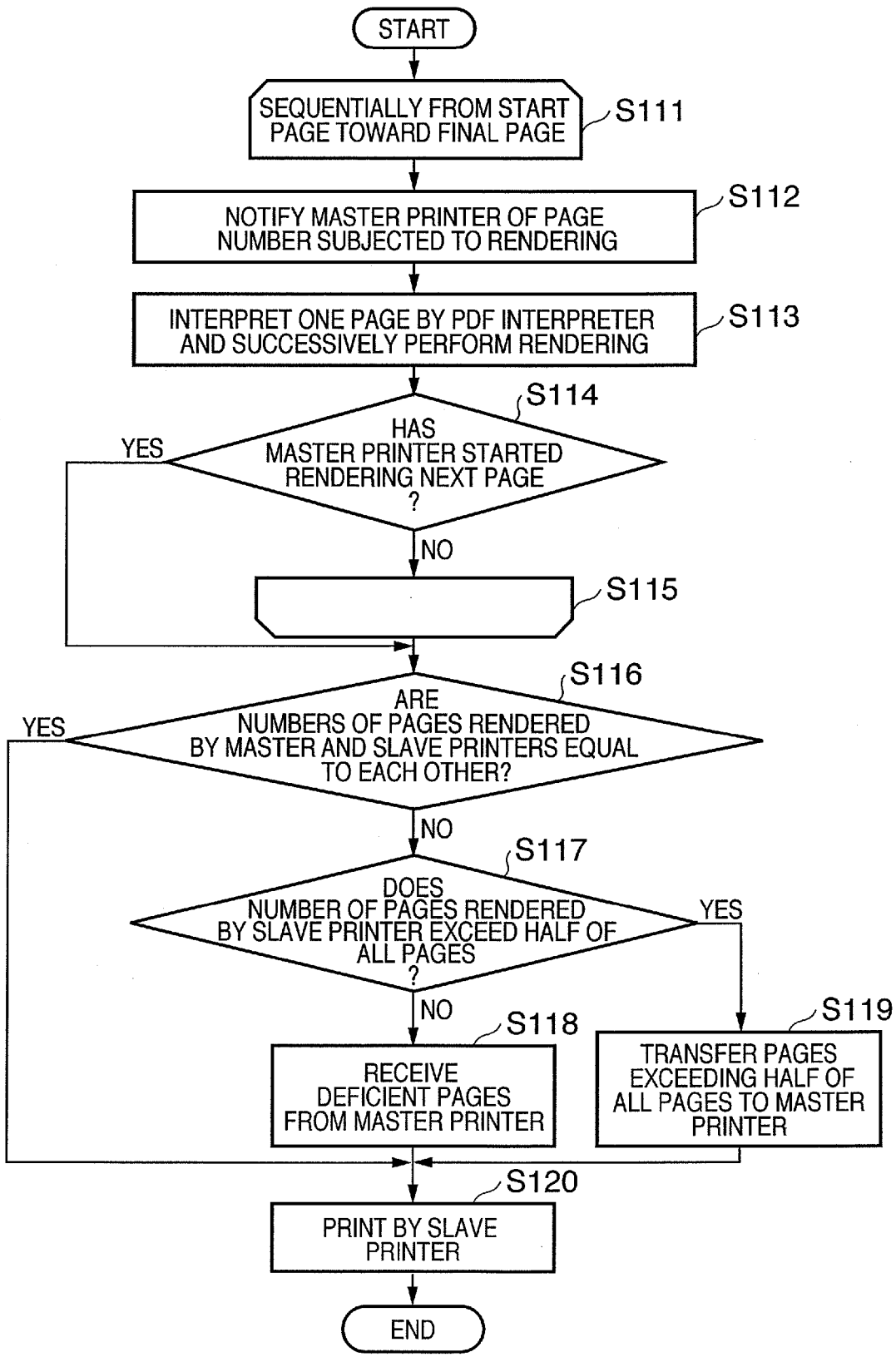
FIG. 17 is a flowchart showing process procedures when the image forming apparatus functions as a slave printer in the third embodiment.

The process procedures of the slave printer in the third embodiment will be explained with reference to the flowchart of FIG. 17. The Job Manager module 1520 and Printer Manager module 1526 in FIG. 5 execute a program shown in the flowchart of FIG. 17. The job ticket designates the operation of the slave printer in cluster printing. The Job Manager module 1520 and Printer Manager module 1526 are notified via the Control API module 1519 of the result of interpretation by the Job Ticket Parser 1531.

In a loop process in steps S111 to S115, the slave printer performs, for each page, page interpretation and rendering complying with PDF data received from the master printer. The process order at this time is the descending page order from the final page toward the start page. Also in this loop, the slave printer notifies the master printer of a page number during rendering. In addition, the slave printer determines whether the master printer has started rendering a page to be rendered next by the slave printer. If the slave printer determines that the master printer has started rendering a page to be rendered next, or pages have been rendered up to the start page, the process escapes from this loop process.

After escaping from the process in steps S111 to S115, the slave printer executes the process in step S116. In step S116, the slave printer determines whether the numbers of pages rendered by the master and slave printers are almost equal to each other. This determination is the same as steps S12 and S31 in the first embodiment. If the slave printer determines that the numbers of rendered pages are equal to each other, the process advances to step S120 to print pages from the start page on the basis of rendering data stored in the HDD. More specifically, when the print job has 100 pages in total, the HDD stores rendering data of pages 51, 52, . . . , 100, and the slave printer prints pages in an order of pages 51, 52, . . . .

If the slave printer determines in step S116 that the numbers of pages rendered by the master and slave printers are different from each other, the process advances to step S117. In step S117, the slave printer determines whether the number of pages rendered by the slave printer exceeds half of all pages. If NO in step S117, the process advances to step S118; if YES, to step S119.

If the process advances to step S118, this means that rendering results in the slave printer do not reach half of all pages of the print job. The master printer transmits deficient rendered image data, and the slave printer receives them. When the number of pages of the print job is 100 and the slave printer has rendered up to the 55th page, the slave printer receives the rendering results of pages 51, 52, 53, and 54 from the master printer and stores them in the HDD.

If the process advances to step S119, the slave printer transfers rendered image data of pages exceeding half of all pages of the print job to the master printer. The rendering order of pages by the master printer is the ascending page order. When the number of pages of the print job is 100 and the master printer has rendered up to the 45th page, the slave printer transmits the rendering results of pages 46, 47, 48, 49, and 50 to the master printer.

As a result of the process in step S118 or S119, at least the HDD of the slave printer stores rendering data of pages of the second half out of all pages of the print job. The process advances to step S120 to print the pages of the second half in the ascending page order.

As described above, the third embodiment can distribute not only the load of rendering but also that of page interpretation to two printers for page independent type PDL data, achieving efficient cluster printing.

Figure 18:
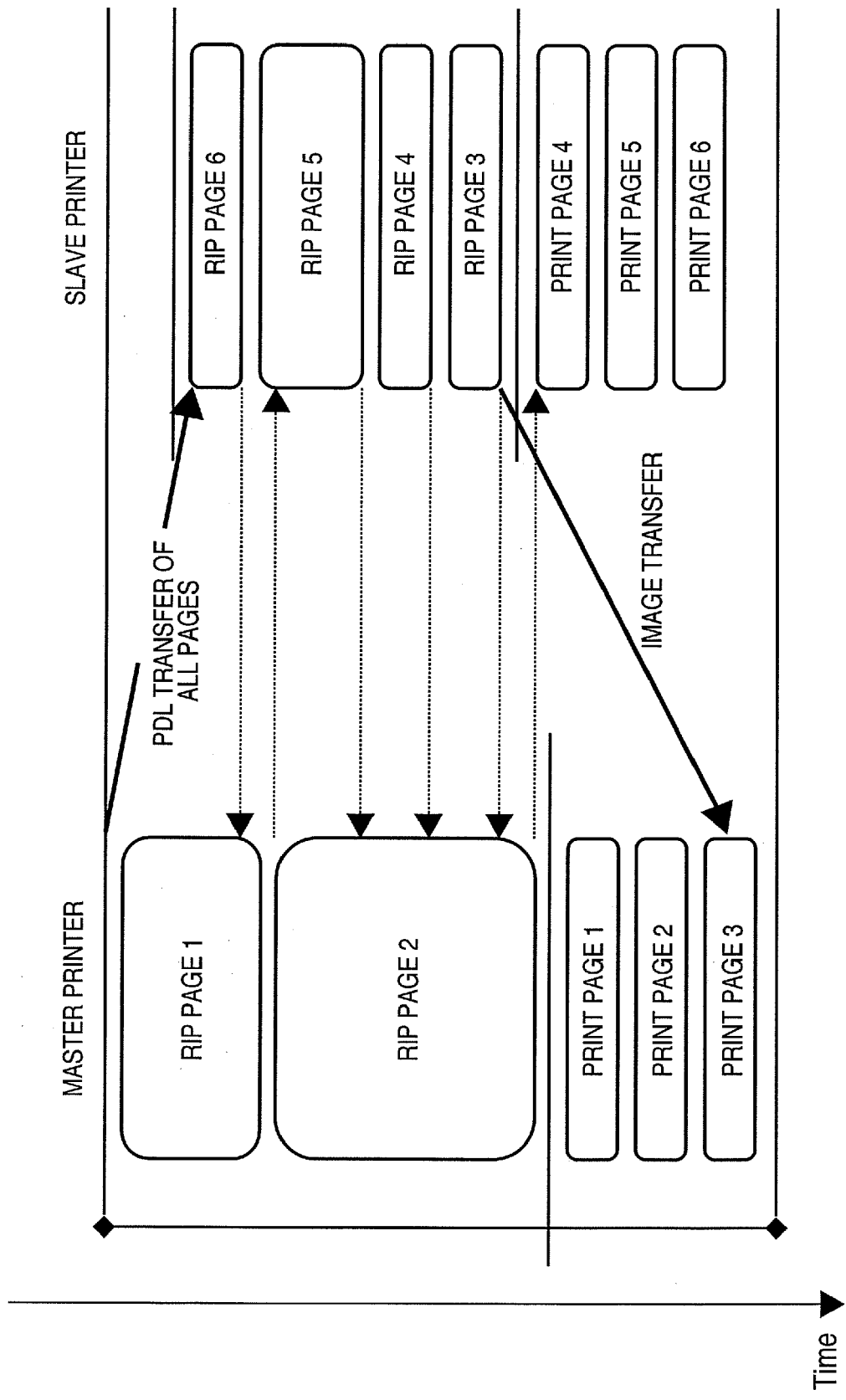
FIG. 18 is a chart showing the process sequences of two printers in the third embodiment.

FIG. 18 shows an example of the sequence when executing cluster printing described with reference to the flowcharts of FIGS. 16 and 17. In this example, the RIP load is distributed by performing the RIP process of two start pages by the master printer and performing the RIP process of the four remaining pages by the slave printer because the RIP process for the first and second pages out of six pages is heavy. The print load is distributed by transferring the image of the third page having undergone RIP from the slave printer to the master printer so as to make the numbers of print pages by the master and slave printers equal to each other. Printer data of several pages have been exemplified for descriptive convenience, and the effects of the third embodiment will become more significant for printer data of several thousand pages. Since the page interpretation process is also distributable between the master and slave printers, the third embodiment can distribute the RIP load more efficiently than the first embodiment. The number of transferred images tends to be smaller than in the second embodiment, implementing the most efficient load-distributed printing.

The first and second embodiments have exemplified PostScript as a page description language, but are also applicable to another page description language. These embodiments suffice to share, between two printers, the result of converting data into intermediate data (display list data) independent of the page description language, and perform rendering. The third embodiment has exemplified PDF as a page independent type language, but is not limited to PDF as long as the language is independent for each page.

Fourth Embodiment

The first to third embodiments have exemplified cluster printing by two image forming apparatuses, but three or more image forming apparatuses may perform cluster printing. For descriptive convenience, the first embodiment is applied to execute cluster printing by three printers. Assume that the printing units of the three image forming apparatuses have the same print performance (the number of print sheets per unit time).

A host computer 2100 outputs, to a master image forming apparatus, a job ticket describing the network addresses of image forming apparatuses serving as slave printers A and B. The master-slave relationship is based on an order of the master, slave A, and slave B. That is, slave printer A functions as a slave printer to a master printer, and also functions as a master printer to slave printer B.

When generating display list data of a print job, the master printer transfers it to slave printers A and B. The operation of each printer upon completion of the transfer will be described below.

Assume that the total number of pages of the print job is 99.

Figure 19:
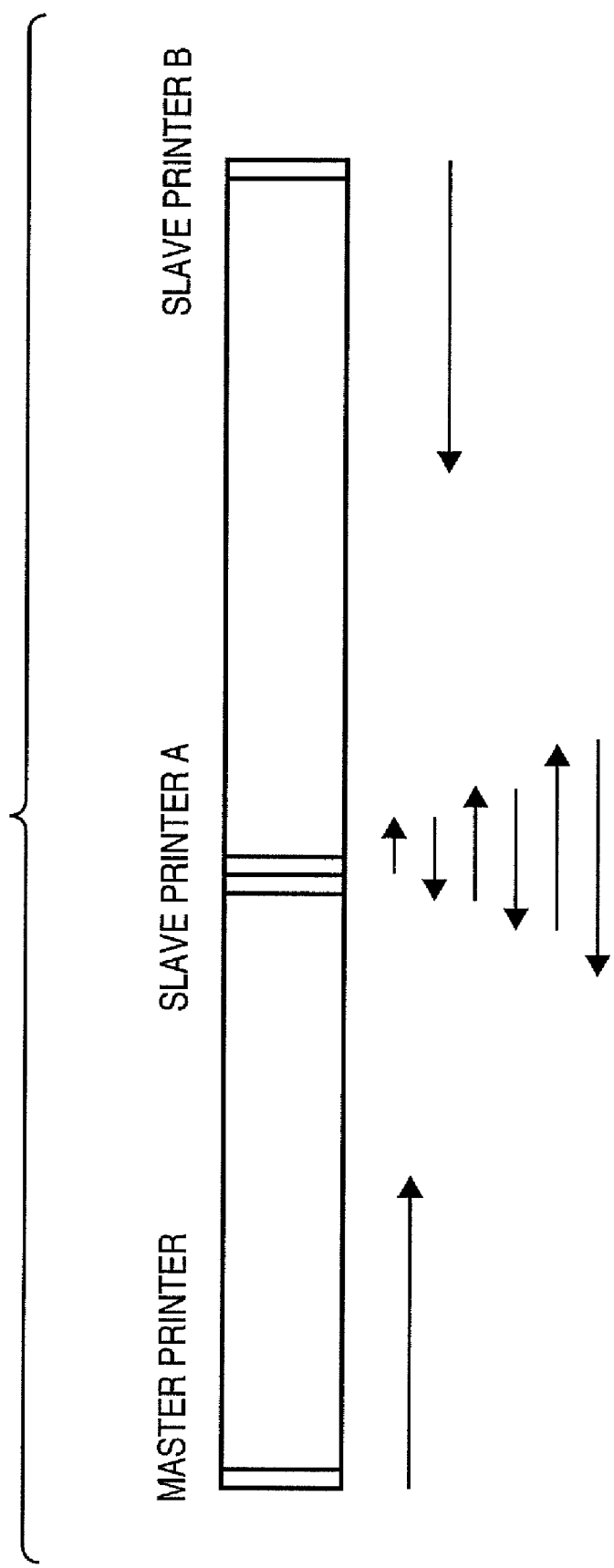
FIG. 19 is a chart showing a rendering sequence in the fourth embodiment.

As shown in FIG. 19, the master printer renders pages in an order (ascending page order) of pages 1, 2, 3, . . . . The master printer repeats this process until the next page number subjected to rendering coincides with a page number during rendering by slave printer A.

As shown in FIG. 19, slave printer B renders pages in an order (descending page order) of pages 99, 98, 97, . . . . Slave printer B repeats this process until the next page number subjected to rendering coincides with a page number during rendering by slave printer A.

Slave printer A at an intermediate position between the master and slave printer B operates as shown in FIG. 19, i.e., executes the following process.

Slave printer A decides that it is to render first a page of page number "49" (=an integer of 99/2) at the center of all pages of the print job. In principle, slave printer A renders pages in the following order:

pages 49, 50, 48, 51, 47, 52, . . .

More specifically, slave printer A starts a page number subjected to rendering from the initial value "49", and alternately switches the rendering order between the ascending and descending page orders (holds the variable i for rendering in the ascending page order and the variable K for rendering in the descending page order). If the next page number subjected to rendering in the process of rendering in the descending page order coincides with a page number during rendering by the master printer, slave printer A ends rendering in the descending page order. If the next page number subjected to rendering in the process of rendering in the ascending page order coincides with a page number during rendering by slave printer B, slave printer A ends rendering in the ascending page order.

Upon completion of rendering all pages by the three printers, rendering results are exchanged between [master: slave printer A] and [slave printers A and B]. That is, the master printer holds the rendering results of page numbers 1 to 33, slave printer A holds the rendering results of page numbers 34 to 66, and slave printer B holds the rendering results of page numbers 67 to 99.

In the subsequent process, each printer prints its assigned pages in the ascending page order.

By the above process, three printers do not always end rendering at the same time. For example, when the master printer and slave printer A complete rendering 50 pages of the first half, slave printers A and B may not complete rendering 50 pages of the second half. For this reason, slave printer A positioned between the master printer and slave printer B performs the following process.

The mater and slave printer B notify slave printer A of page numbers during rendering by them, and slave printer A can detect which of the printers proceeds slower. Slave printer A determines a page number subjected to rendering in accordance with the slower progress.

More specifically, slave printer A calculates the difference between the number NP1 of unrendered pages between the master printer and slave printer A and the number NP2 of unrendered pages between slave printers A and B. If the absolute value (=|NP1−NP2|) of the difference is equal to or smaller than a predetermined threshold, slave printer A repeats the rendering process in the ascending and descending page orders, as described above.

If |NP1−NP2| exceeds the threshold, slave printer A performs rendering preferentially in accordance with the slower progress.

For example, if NP1=10, NP2=20, and the threshold is "3", slave printer A preferentially executes a rendering process in the ascending page order. Slave printer A makes the determination and the decision of the rendering order every time it renders one page.

As a result, each printer completes rendering at almost the same timing.

Then, the master printer and slave printer A compensate for deficient rendering results so as to hold rendering results at 2:1. To the contrary, slave printers A and B compensate for deficient rendering results so as to hold rendering results at 1:2.

As described above, according to the fourth embodiment, three printers can execute cluster printing. When four or more printers are to perform cluster printing, i.e., the master and slaves A, B, and C are to print, the number of pages to be printed by each printer is ¼ of the total number of pages. A description of this process will be omitted because the process is the same as the above one except that slave printers A and B function as intermediate printers.

The fourth embodiment has described that the use of three or more printers is applied to the first embodiment, but it will be easily understood from the above description that the use of three or more printers is also applicable to the second and third embodiments.

The embodiments according to the present invention have been explained. In the embodiments, when printing upon reception of rendering results, each printer prints from the start of its assigned page range. However, this does not limit the present invention. When a finisher apparatus connected to an image forming apparatus does not have any facedown discharge function, each printer desirably discharges pages from the final page of its assigned page range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-031349, filed Feb. 8, 2006, which is hereby incorporated by reference herein in its entirety.

What is claimed is:

1. A printing system comprising:
a first printing apparatus;
a second printing apparatus;
a reception unit which receives a print job from an external apparatus;
a first conversion unit which converts data of part of pages among data of a plurality of pages included in the print job into image data available for a print process in the first printing apparatus;
a second conversion unit which converts, among the data of the plurality of pages included in the print job, data of pages other than the data of the pages to be converted by said first conversion unit into image data available for a print process in the second printing apparatus;
a first holding unit which holds the image data converted by the first conversion unit in the first printing apparatus;
a second holding unit which holds the image data converted by the second conversion unit in the second printing apparatus;
a transmission unit which, after said first and second conversions units obtain images of all of the pages included in the print job and before the first and second printing apparatuses initiate the print processes based on the obtained images, if the number of page images held by the second holding unit is larger than that of the first holding unit, transmits part of images held by the second holding unit to the first holding unit so that the first and second printing apparatuses print the same number of pages;
a first print unit which executes the print process based on the image data held in the first holding unit in the first printing apparatus; and
a second print unit which executes the print process based on the image data held in the first holding unit in the second printing apparatus.

2. The system according to claim 1, further comprising:
an intermediate data generation unit which generates intermediate data of a plurality of pages of the print job received from the external apparatus;
wherein said first conversion unit converts the intermediate data in a page order,
wherein said second conversion unit converts the intermediate data in an order opposite to the page order, and
wherein image data of all pages are generated by repeating the conversion until a page converted by said first conversion unit is consecutive to a page converted by said second conversion unit.

3. The system according to claim 2, wherein:
said intermediate data generation unit generates the intermediate data in the first printing apparatus, and
the system further comprises an intermediate data transmission unit which transmits the intermediate data generated by said intermediate data generation unit to the second printing apparatus.

4. The system according to claim 3, wherein after said intermediate data generation unit generates intermediate data of all pages of the print job, said intermediate data transmission unit transmits the intermediate data of all pages to the second printing apparatus.

5. The system according to claim 3, wherein every time said intermediate data generation unit generates intermediate data of one page of the print job, said intermediate data transmission unit transmits the intermediate data of one page to the second printing apparatus.

6. The system according to claim 2, wherein said intermediate data generation unit comprises a first intermediate data generation unit which generates intermediate data of the first page range in the first printing apparatus, and a second intermediate data generation unit which generates intermediate data of the second page range in the second printing apparatus.

7. The system according to claim 1, further comprising:
a setting unit which sets a distribution of the number of pages of image data to be printed by the first printing apparatus and the number of pages of image data to be printed by the second printing apparatus when executing the print process based on the image data of the plurality of pages of the print job,
wherein said setting unit sets the distribution on the basis of a print process speed of the first printing apparatus and a print process speed of the second printing apparatus.

8. A printing apparatus connectable to another printing apparatus via a network, the printing apparatus comprising:
a reception unit which receives a print job from an external apparatus;
an intermediate data generation unit which generates intermediate data of a plurality of pages, including a first page range and a second page range, of the print job received by said reception unit;
an intermediate data transmission unit which transmits the intermediate data generated by said intermediate data generation unit to the other printing apparatus;
a data conversion unit which converts the intermediate data of the first page range of the print job generated by said intermediate data generation unit to generate image data available for the print process in the printing apparatus;
an image data holding unit having a first holding unit which holds the image data converted by the data conversion unit;
a setting unit which sets a distribution of the number of pages of image data to be printed by the printing apparatus and the number of pages of image data to be printed by the other printing apparatus when executing the print process of the image data of the plurality of pages of the print job generated by said data conversion unit;

an image data communication unit which, when the distribution set by said setting unit is different from distribution of the number of pages of the first page range and the number of pages of the second page range, which is to be converted into image data by the other printing apparatus, and the number of pages of the first page range exceeds the number of pages of image data to be printed by the printing apparatus set by said setting unit, transmits at least one page of image data corresponding to the number of pages exceeding pages set by the setting unit to the other printing apparatus, and when the number of pages of the first page range is smaller than the number of pages distributed to the printing apparatus by said setting unit, receives image data corresponding to deficient pages from the other printing apparatus so that distribution of the number of pages of image data held by the holding unit of the printing apparatus and the number of pages of image data held by the corresponding holding unit of the other printing apparatus is equal to the distribution set by said setting unit; and a printing unit which executes the print process on the basis of image data distributed to the printing apparatus after said image data communication unit performs communication.

9. The apparatus according to claim 8, wherein said data conversion unit converts the intermediate data generated by said intermediate data generation unit in a page order, and repeats the conversion until a page converted by said data conversion unit is consecutive to a page converted by the other printing apparatus.

10. The apparatus according to claim 8, wherein after said intermediate data generation unit generates intermediate data of all pages corresponding to the print job, said intermediate data transmission unit transmits the intermediate data of all pages to the other printing apparatus.

11. The apparatus according to claim 8, wherein every time said intermediate data generation unit generates intermediate data of one page of the print job, said intermediate data transmission unit transmits the intermediate data of one page to the other printing apparatus.

12. The apparatus according to claim 8, wherein said setting unit sets the distribution on the basis of a print process speed of the printing apparatus and a print process speed of the other printing apparatus.

13. A printing method in a printing system having at least first and second printing apparatuses, each of which executes a print process, the method comprising:

an intermediate data generation step of generating intermediate data of a plurality of pages of a print job received from an external apparatus;

a data conversion step of generating image data of a plurality of pages of the print job, the data conversion step, and having a first conversion step of converting the intermediate data of a first page range of the print job into image data available for the print process in the first printing apparatus, and a second conversion step of converting the intermediate data of a second page range of the print job into image data available for the print process in the second printing apparatus;

an image data holding step of holding the image data converted by the first conversion step in a first holding unit of the first printing apparatus, and holding the image data converted by the second conversion step in a second holding unit of the second printing apparatus;

a setting step of setting a distribution of the number of pages of image data to be printed by the first printing apparatus and the number of pages of image data to be printed by the second printing apparatus when executing the print process of the image data of the plurality of pages of the print job generated in the data conversion step;

an image data transmission step of, when the distribution set in the setting step is different from distribution of the number of pages of the first page range and the number of pages of the second page range, transmitting at least one page of image data from one of the first or second printing apparatus, which holds image data by the number of pages exceeding the distribution set in the setting step, to the other of the first or second printing apparatus so that the distribution of the number of pages of image data held by the first holding unit and the number of pages of image data held by the second holding unit is equal to the distribution set in said setting step; and a printing step of executing the print process on the basis of image data held by the first printing apparatus and executing the print process on the basis of image data held by the second printing apparatus.

* * * * *